US011436209B2

(12) United States Patent
Shabi et al.

(10) Patent No.: US 11,436,209 B2
(45) Date of Patent: Sep. 6, 2022

(54) TECHNIQUES FOR EFFICIENTLY DETERMINING SIMILARITY HASHES

(71) Applicant: EMC IP Holding Company LLC, Hopkinton, MA (US)

(72) Inventors: Uri Shabi, Tel Mond (IL); Alon Titelman, Herzliya (IL); Alexei Kabishcer, Ramat Gan (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 386 days.

(21) Appl. No.: 16/669,860

(22) Filed: Oct. 31, 2019

(65) Prior Publication Data
US 2021/0133175 A1   May 6, 2021

(51) Int. Cl.
G06F 16/00 (2019.01)
G06F 16/22 (2019.01)
G06F 16/215 (2019.01)
G06F 9/30 (2018.01)
G06F 16/33 (2019.01)

(52) U.S. Cl.
CPC ...... *G06F 16/2255* (2019.01); *G06F 9/30036* (2013.01); *G06F 9/30043* (2013.01); *G06F 16/215* (2019.01); *G06F 16/2264* (2019.01); *G06F 16/3347* (2019.01)

(58) Field of Classification Search
CPC .. G06F 16/174; G06F 16/215; G06F 16/2255; G06F 16/2264; G06F 16/3347; G06F 9/3001; G06F 9/30018; G06F 9/30021; G06F 9/30036; G06F 9/30043; G06F 9/30109
See application file for complete search history.

(56) References Cited

U.S. PATENT DOCUMENTS

| 9,367,557 | B1 * | 6/2016 | Lin | G06F 16/1744 |
| 9,411,815 | B1 * | 8/2016 | Lu | G06F 11/1453 |
| 9,514,146 | B1 * | 12/2016 | Wallace | G06F 16/24561 |
| 9,647,682 | B1 * | 5/2017 | Heng | H03M 7/42 |
| 10,216,754 | B1 * | 2/2019 | Douglis | G06F 16/1744 |

(Continued)

OTHER PUBLICATIONS

Uri Shabi, et al., "Similarity Hash for Binary Data Pages," U.S. Appl. No. 16/669,886, filed Oct. 31, 2019.

(Continued)

*Primary Examiner* — Diedra McQuitery
(74) *Attorney, Agent, or Firm* — Muirhead and Saturnelli, LLC

(57) ABSTRACT

Techniques for data processing may include: receiving a data block P having a binary representation; determining features for the data block P; determining, using at least one table of precomputed hash values, feature hashes for the features, wherein each of the feature hashes corresponds to a different feature, wherein each of the feature hashes is one of the precomputed hash values of the at least one table; and determining, in accordance with the feature hashes, a similarity hash for the data block P. Each feature may be a byte of P. The at least one table may be a single 3 dimensional or multiple 2 dimensional tables. Each row of a table of precomputed hash values may correspond to a single precomputed hash value. The row may include byte entries where each byte entry includes a single bit value of a precomputed hash.

18 Claims, 19 Drawing Sheets

(56) References Cited

U.S. PATENT DOCUMENTS

| | | | | |
|---|---|---|---|---|
| 10,224,957 | B1* | 3/2019 | Cassetti | G06F 16/24568 |
| 10,476,518 | B1* | 11/2019 | Chang | G06F 16/2255 |
| 2008/0133536 | A1* | 6/2008 | Bjorner | H04L 67/28 |
| 2016/0371292 | A1* | 12/2016 | Narasimha | H03M 7/3091 |
| 2017/0250708 | A1* | 8/2017 | Blaettler | H03M 7/6017 |
| 2020/0169268 | A1* | 5/2020 | Billa | H03M 7/3095 |

OTHER PUBLICATIONS

Moses S. Charikar, "Similarity Estimation Techniques from Rounding Algorithms," Princeton University, May 19-21, 2002.
http://matpalm.com/resemblance/simhash/,May 2009, "Part 3: the simhash algorithm" from the blog of Mat Kelcey, Author: Mat Kelcey.

* cited by examiner

TECHNIQUES FOR EFFICIENTLY DETERMINING SIMILARITY HASHES

BACKGROUND

Technical Field

This application generally relates to data storage and, more particularly, determining a similarity measurement that may be used, for example, in connection with data reduction techniques.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for processing data that comprises receiving a data block P having a binary representation; determining a plurality of features for the data block P; determining, using at least one table of precomputed hash values, a plurality of feature hashes for the plurality of features, wherein each of the plurality of feature hashes corresponds to a different one of the plurality of features, wherein each of the plurality of feature hashes is one of the precomputed hash values of the at least one table; and determining, in accordance with the plurality of feature hashes for the plurality of features, a similarity hash for the data block P. Each of the plurality of feature hashes may be determined using a hash function and in accordance with one of the plurality of features and a unique index associated with said one of the plurality of features. The data block P is partitioned into N features. Each of the N features may have a corresponding index included in a feature index range. Each of the N features may have a corresponding bit representation denoting an integer included in a feature value range. The at least one table may include each possible hash value computable by the hash function in accordance with the feature value range and the feature index range.

In at least one embodiment, each of the N features may be a different byte of the data block P, wherein the feature index range is from 0 through N−1 inclusively, and wherein the feature value range is a byte value range from 0 through 255 inclusively.

In at least one embodiment, the at least one table is a single table having three dimensions, wherein a first of the three dimensions corresponds to unique indices associated with features, a second of the three dimensions corresponds to integer values of bit representations of features, and a third dimension of the three dimensions corresponds to bit positions of precomputed hash values stored in the single table. Each entry of the single table may be a byte that stores a single bit value of one precomputed hash value stored in the single table, and wherein each row of the single table may be a representation of a single precomputed hash value stored in the single table.

In at least one embodiment, the at least one table may include N tables and wherein each one of the N tables may include precomputed hash values for a different unique index associated with one of the N features.

In at least one embodiment, each of the N tables may have a first dimension corresponding to integer values of bit representations of features, and a second dimension corresponding to bit positions of precomputed hash values. Each entry of each of the N tables may be a byte that stores a single bit value of one precomputed hash value stored in the single table, and wherein each row of each of the N tables may be a representation of a single precomputed hash value stored in the single table. Each of the plurality of feature hashes may have a size of K bits, and wherein the similarity hash for the data block P may have a size of K bits. A first row of a first of the N tables may represent a first hash value for a first of the plurality of features of the data block P. The method may include loading the first row of the first table into a first register using a vectorized load instruction, wherein the first register is configured to have K elements, and wherein the vectorized load instructions loads entries of the first row into corresponding elements of the first register; and adding the first register to an accumulation register using a vectorized add instruction, wherein the accumulation register is configured to have K elements and the vectorized add instruction adds elements of the first register to corresponding elements of the accumulation register and stores results in the corresponding elements of the accumulation register. The K elements may denote K counters, wherein MAX may be a maximum value that can be represented by each of the K counters in accordance with a number of bits of each of the K counters. Responsive to determining that MAX hash values have been added corresponding to MAX features of the data block P, first processing may be performed to avoid possible overflow of the K counters. The first processing may include: partitioning the K elements of the accumulation register into a first portion of K/2 elements and a second portion of K/2 elements; using a vectorized add instruction to add the first portion of K/2 elements of the accumulation register to a first additional accumulation register configured to have K/2 elements, wherein each of the K/2 elements of the first additional accumulation register includes a larger number of bits than each of the K elements of the accumulation register; and using a vectorized add instruction to add the second portion of K/2 elements of the accumulation register to a second additional accumulation register configured to have K/2 elements, wherein each of the K/2 elements of the second additional accumulation register includes a larger number of bits than each of the K elements of the accumulation register. The first additional accumulation register and the second additional accumulation register may be collectively configured to have K elements representing the K counters, wherein each of the K counters may have a value indicating a total count of 1 bit values for a corresponding bit position of the similarity hash for the data block P.

In at least one embodiment, processing may include using a first vectorized comparison instruction to compare each of the K/2 elements of the first additional accumulation register to a first value, N/2, and determine whether each of the K/2 elements has a counter value greater than the first value, wherein the first vectorized comparison instruction stores a resulting value in each of the K/2 elements indicating whether said each elements has a counter value greater than the first value.

In at least one embodiment, processing may include performing data reduction processing using the similarity has for the data block P. The data reduction processing may include compression processing. The data reduction processing may include deduplication processing.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
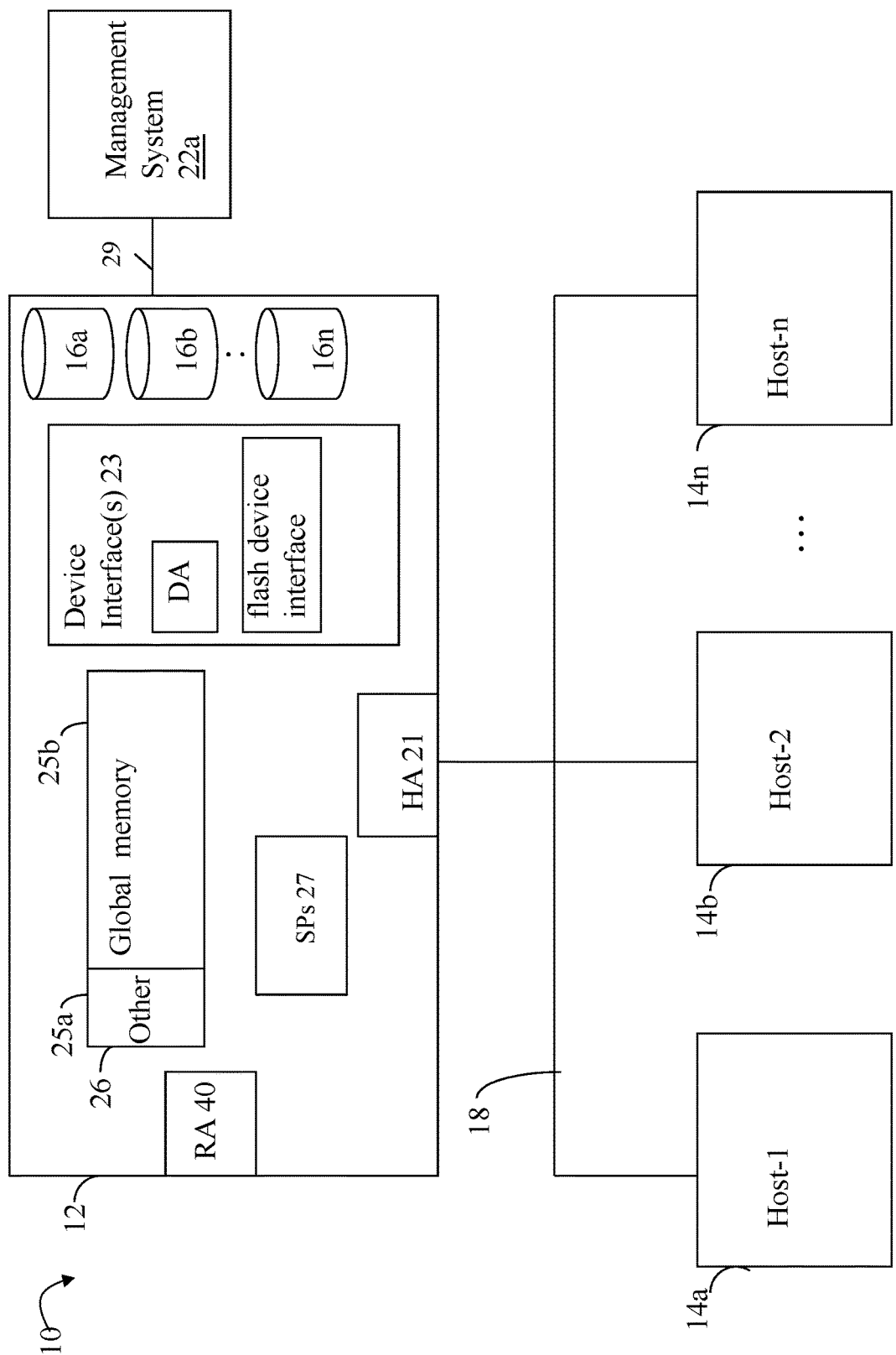
FIGS. 1 and 2B are examples of components that may be included in a system in accordance with techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS), and the like. Some or all of the connections by which the hosts 14a-14n and the data storage system 12 may be connected to the communication medium 18 may pass through other communication devices, such switching equipment that may exist such as a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, techniques herein may be used in connection with any suitable storage system, appliance, device, and the like, in which data is stored. For example, an embodiment may implement techniques herein using a midrange data storage system, such as a Dell EMC Unity® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

An embodiment of a data storage system in accordance with techniques herein may perform different data processing operations or services on stored user data. For example, the data storage system may perform one or more data reduction operations, such as data deduplication and compression, as well as other types of operations or services. Such data reduction operations attempt to reduce the amount of storage needed for storing data on non-volatile backend storage devices (e.g., PDs) with the goal of reducing the cost per unit of storage consumed (e.g., dollar cost per GB of storage). Generally, data deduplication and compression techniques are known in the art and any suitable such technique may be used in an embodiment in accordance with techniques herein. In at least one embodiment, the compression technique may be a lossless compression technique such as an algorithm from the Lempel Ziv algorithm family (e.g., LZ77, LZ78, LZW, LZR, and the like). In at least one embodiment in accordance with techniques herein, data deduplication processing performed may include digest or hash value computation using an algorithm such as based on the SHA-256 cryptographic hashing algorithm known in the art. Data deduplication generally refers to removing redundant or duplicate data portions. Data deduplication techniques may include looking for duplicate data blocks whereby only a single instance of the data block is retained (stored on physical storage) and where pointers or references may be used in connection with duplicate or redundant copies (which reference or identify the single stored instance of the data block).

Figure 2A:
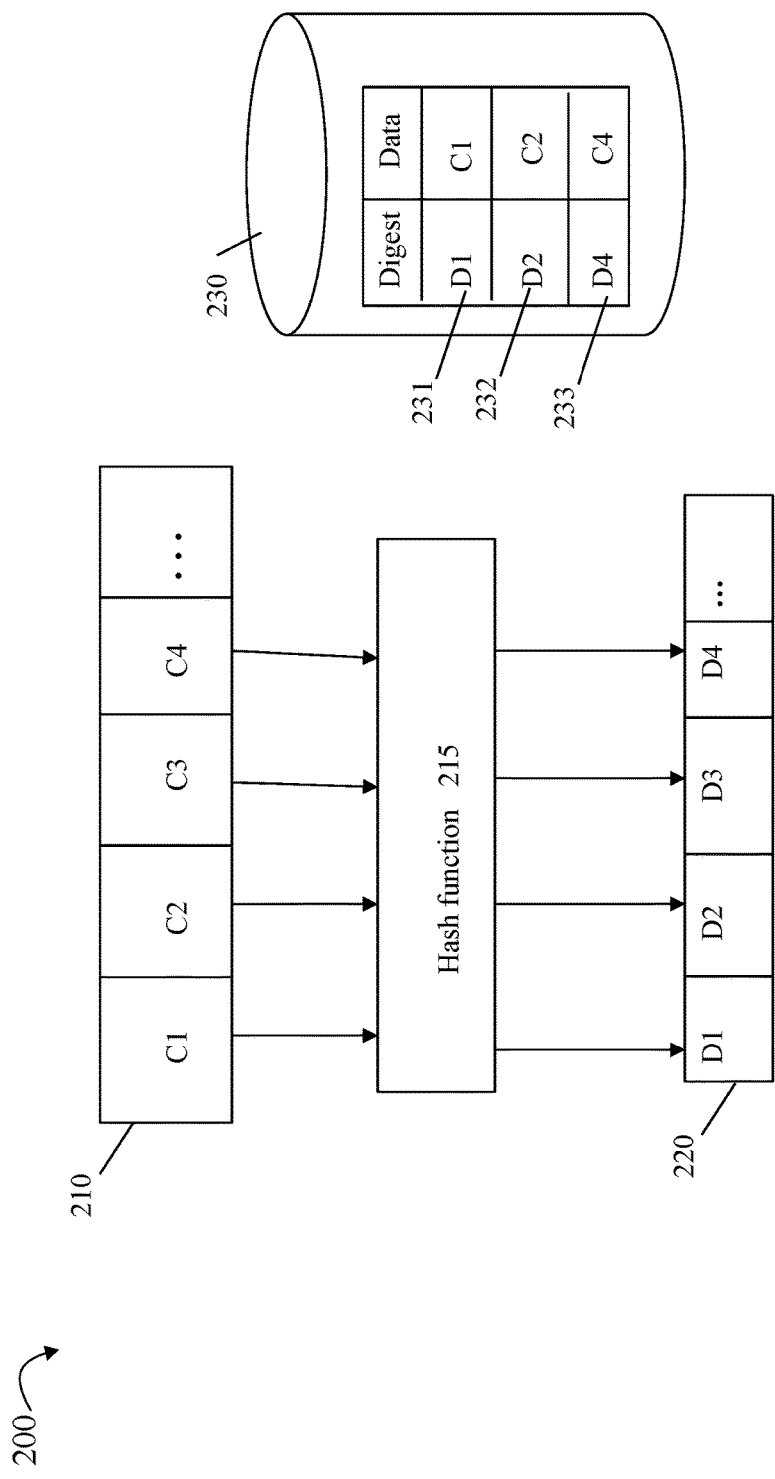
FIG. 2A is an example illustrating data deduplication as may be performed in an embodiment in accordance with techniques herein.

Referring to the FIG. 2A, shown is an example 200 illustrating processing that may be performed in connection with data deduplication processing in an embodiment in accordance with techniques herein. The element 210 may denote the original data being written or stored on back-end non-volatile storage. The original data may be partitioned into multiple data blocks C1, C2, C3, C4 and the like. In at least one embodiment and for purposes of illustration, the data blocks may all be the same size where the size may vary with embodiment. As a variation depending on the data deduplication technique utilized, the blocks of 210 may be of varying or different sizes. Each block is provided as an input to hash function 215. As noted above, in at least one embodiment, the hash function 215 may be the SHA-256 hashing algorithm, or more generally, any suitable cryptographic, or non-cryptographic hashing function known in the art. For each block of 210, the hash function 215 may perform processing and generate, as an output, a hash value or digest. The element 220 includes digests D1, D2, D3, D4, and the like, where a corresponding different one of the digests DN is generated for one of the blocks CN (where "N" is an integer denoting the block and associated digest generated for that block). For example, D1 is the digest generated for C1, D2 is the digest generated for C2, D3 is the digest generated for C3, and so on. Generally, a hash function 215 is selected which has an acceptably low probability of a "hash collision" of generating the same digest or hash value for two different blocks. The strength of the hash function 215 may be measured by the unlikelihood of a collision occurring where two different input blocks of data produce the same digest. The strength increases with the bit length of the hash value or digest. Thus, if two blocks, such as C1 and C3, have the same digests whereby D1=D3, then blocks C1 and C3 match (e.g., are identical matching data blocks). If two blocks, such as C1 and C4, have different digests whereby D1 does not equal D4, then blocks C1 and C4 do not match (e.g., are different or non-matching data blocks). In cases where two matching or identical blocks have the same digest, only a single copy of the data block is stored on backend non-volatile physical storage of the data storage system. The single stored instance of the data block may be referenced using a pointer, handle, the digest of the block, and the like.

The element 230 of the FIG. 2A may denote the data store, such as a data base (DB) used to store data blocks. In this example, as noted above, assume blocks C1 and C3 are the same with remaining blocks C2 and C4 being unique. In at least one embodiment, element 230 may be organized and managed using a data structure, such as a hash table. In at least one embodiment, computed digests, or portions thereof, may be used as an index into the hash table where the single unique instances of data blocks may be stored (along with other metadata as may be needed for maintaining the table and also in accordance with the particular hash table management used in an embodiment). Hash tables are data structures known in the art. A hash table uses a hash function to compute an index into an array of buckets or slots, from which the desired data can be found. In this example, the block of data may be mapped by hash function 215, and thus by the block's digest, to a particular entry in the table at which the block of data is stored. To further illustrate, the hash function 215 may be used to generate a hash value or digest for a particular data block. The digest is then further mapped (e.g., such as by another mathematical function, using particular portions of the digest, and the like) to a particular index or entry of the hash table. The particular mapping used to map the digest to a corresponding table entry varies, for example, with the digest and the size of hash table.

When storing a new data block, such as C1, its digest may be mapped to a particular hash table entry 231 whereby if the table entry is null/empty, or otherwise does not already include a data block matching C1, then C1 is stored in the table entry along with its associated digest D1 (this is the first time block C1 is recorded in the data store 230). Otherwise, if there is already an existing entry in the table including a data block matching C1, it indicates that the new data block is a duplicate of an existing block. In this example as noted above, processing is performed for C1, C2, and C4 respectively, where entries 231, 232, and 233 are added since there are no existing matching entries in the hash table. When processing block C3, as noted above, C3 has a digest D3 matching D1 whereby C3 (and thus D3) maps to entry 231 of the hash table already including a matching block C1 (so no additional data block is added to 230 for C3 since C3 is determined as a duplicate of C1). In connection with representing a particular file or other storage entity including multiple duplicate occurrences of a particular block such as C3, the single instance or copy of the data may be stored in 230. Additionally, a handle or reference, such as identifying the hash table entry 231, its digest, and the like, may be used to reference the single instance or copy of the data storage in 230. When reconstructing or restoring data to its original form, the handle or reference into the hash table for block C3 may be used to obtain the actual C3 block of data from 230.

Figure 2B:
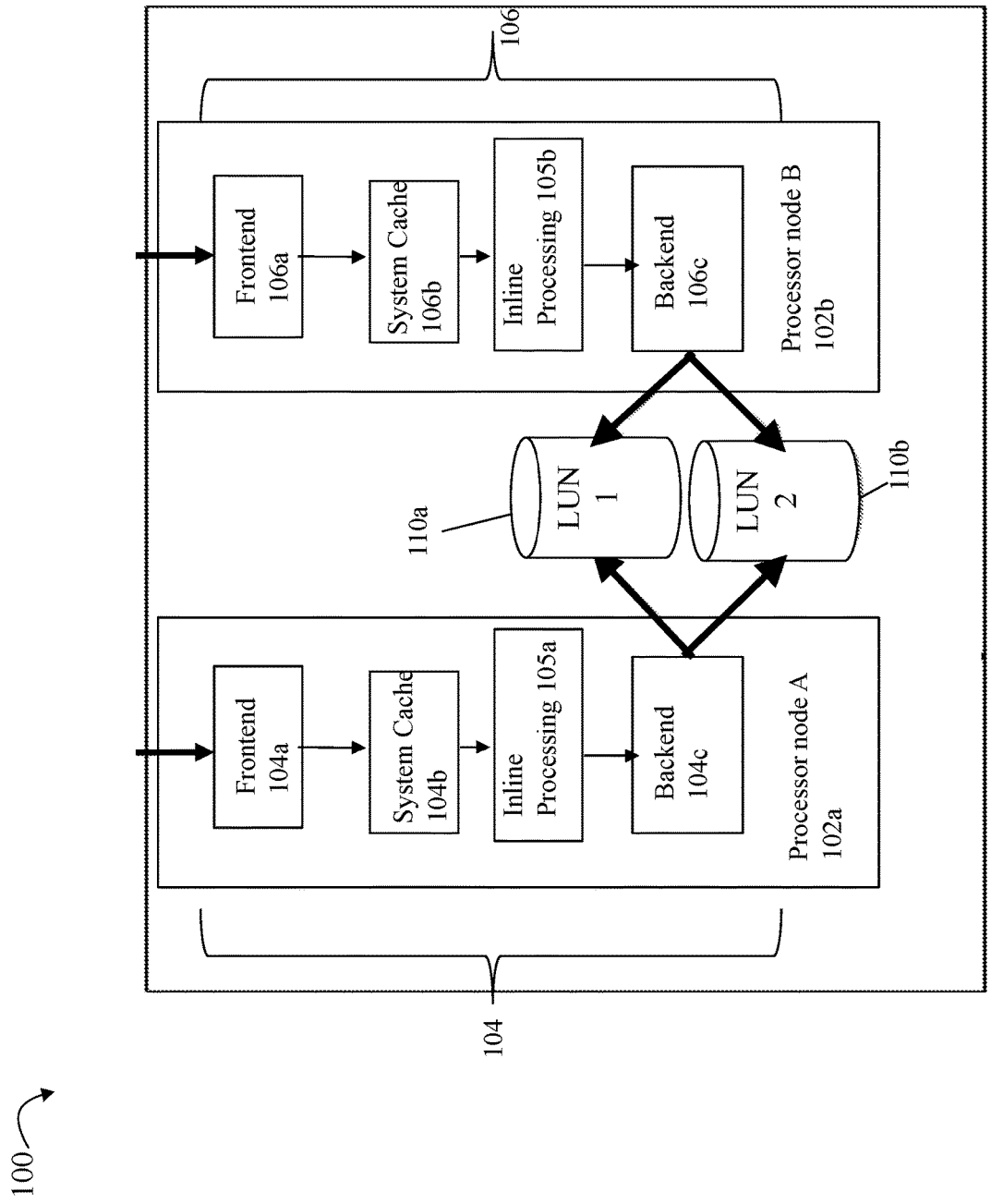

With reference to the FIG. 2B, shown is an example 100 illustrating components that may be included in the data path in at least one existing data storage system in accordance with the techniques herein. The example 100 includes two processor nodes A 102a and B 102b and associated software stacks 104, 106 of the data path where I/O requests may be received by either processor node 102a or 102b. In the example 200, the data path 104 of processor node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and permanent non-volatile storage (e.g., back end physical non-volatile storage devices accessed by BE components such as DAs as described herein). During movement of data in and out of the system cache layer 104b (e.g., such as in connection with read and writing data respectively, to physical storage 110a, 110b), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include performing compression and data duplication. Although in following paragraphs reference may be made to inline processing including compression and data deduplication, more generally, the inline processing may include performing any suitable or desirable data processing operations as part of the I/O or data path (e.g., where such operations may include any of compression and data deduplication, as well as any other suitable data processing operation).

In a manner similar to that as described for data path 104, the data path 106 for processor node B 102b has its own FE component 106a, system cache layer 106b, inline processing layer 105b, and BE component 106c that are respectively similar to components 104a, 104b, 105a and 104c. The elements 110a, 110b denote physical storage provisioned for LUNs whereby an I/O may be directed to a location or logical address to read data from, or write data to, the logical address. The LUNs 110a, 110b are examples of storage objects representing logical storage entities included in an existing data storage system configuration. Since, in this example, writes directed to LUNs 110a, 110b may be received for processing by either of the nodes 102a and 102b, the example 100 illustrates what may also be referred to as an active-active configuration.

In connection with a write operation as may be received from a host and processed by processor node A 102a, the write data may be written to the system cache 104b, marked as write pending (WP) denoting it needs to be written to physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component 104a). At various points in time, the WP data stored in the system cache is flushed or written out to the physical storage 110a, 110b. In connection with the inline processing layer 105a, prior to storing the original data on the physical storage 110a, 110b, compression and data deduplication processing may be performed that converts the original data (as stored in the system cache prior to inline processing) to a resulting form (that may include compressed and/or deduplicated portions) which is then written to physical storage 110a, 110b. In at least one embodiment, when deduplication processing determines that a portion (such as a block) of the original data is a duplicate of an existing data portion already stored on 110a, 110b, that particular portion of the original data is not stored in a compressed form and may rather be stored in its deduplicated form (e.g., there is no need for compression of a block determined to be duplicate of another existing block). If the original data portion is not a duplicate of an existing portion already stored on 110a, 110b, the original data portion may be compressed and stored in its compressed form on 110a, 110b.

In connection with a read operation to read a block of data, a determination is made as to whether the requested read data block is stored in its original form (in system cache 104b or on physical storage 110a, 110b), or whether the requested read data block was previously deduplicated or compressed. If the requested read data block (which is stored in its original decompressed, non-deduplicated form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block was previously deduplicated, the read data block is recreated and stored in the system cache in its original form so that it can be returned to the host. If the requested read data block was previously compressed, the block is first decompressed prior to sending the read data block to the host. If the compressed read data block is already stored in the system cache, the data is uncompressed to a temporary or buffer location, the uncompressed data is sent to the host, and the buffer or temporary location is released. If the compressed read data block is not in the system cache but stored on the physical storage 110a, 110b, the compressed read data block may be read from the physical storage 110a, 110b into the system cache, uncompressed to a buffer or temporary location, and then returned to the host. Thus, requested read data stored on physical storage 110a, 110b may be stored in a deduplicated or compressed form as noted above where processing is performed by 105a to restore or convert the deduplicated or compressed form of the data to its original data form prior to returning the requested read data to the host.

In connection with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage.

When the processor performs processing, such as in connection with the inline processing 105a, 105b as noted above, data may be loaded from the main memory and/or other lower cache levels into its CPU cache. In particular, inline compression (ILC) and inline data deduplication (ILD) may be performed as part of the inline processing 105a, 105b. In at least one embodiment, the size of a data block processed by ILC and ILD may be 4096 bytes=4 KB (kilobytes) in size.

Some existing implementations of deduplication use a deduplication data store (dedupe data store or DB) as described in connection with the element 230 of the FIG. 2A having a hash table organized by indices which are randomly distributed so that updates, retrievals, and other data access operations can be costly. The data store may be stored on backend non-volatile storage PDs which can be costly (in terms of time) to access when performing data deduplication processing. To improve performance, some existing implementations may use caching to cache portions of the data store. However, the entire data store is typically not capable of being stored completely in the cache due to the often large size of the data store as compared to the limited size of the cache. Additionally, any cached portion of the data store may not be persistently stored where the cache thus requires repopulation upon reboot of the system.

At least one existing implementation may perform data deduplication at the data block level of granularity, for example, where each entry of the data store 230 is mapped to a single unique data block. As used herein, a target data block or chunk, target block or chunk, or dedupe target refers to a single unique instance of a data block or chunk currently stored in the dedupe data store 230. A candidate data block or chunk, candidate block or chunk, or dedupe candidate refers to a data block or chunk for which deduplication processing is performed with the goal of eliminating duplicate candidate blocks or chunk from being stored. A digest may be computed for the candidate data block using a hash function whereby the digest identified the candidate data block with a high level of uniqueness, even though the digest is typically much smaller than the candidate data block itself. Digests thus enable data block matching between the candidate and target data blocks in the dedupe data store 230 to proceed quickly and efficiently. Consistent with discussion above, for each digest in the dedupe data store 230, the data store 230 stores a pointer that leads to a stored version of the respective target data block. To perform deduplication on a particular candidate block, a storage system computes a digest of the candidate block and searches the dedupe data store 230, or a cached version thereof, for an entry that matches the computed digest. If a match is found, the storage system may then compare the actual content of the target block with the content of the candidate block to ensure the target and candidate data blocks having matching content. If the target and candidate data blocks having matching content, processing may arrange metadata of the candidate block to point to the target data block that the dedupe data store 230 has associated with the matching digest. In this manner, a duplicate copy of the data block is avoided.

The foregoing where matching candidate and target data chunks or blocks are determined may be characterized as a full data block or chunk deduplication at the data block or chunk level of granularity. For a candidate data block or chunk to be deduplicated using full block or chunk deduplication, the entire candidate block or chunk (e.g., all portions or sub-blocks of the candidate data block or chunk) must exactly match an existing target block or chunk. Furthermore, the position or location of each matching sub-block of the candidate block must correspond to the same position or location of the matching sub-block of the target block. For example, if the target block and candidate block each include 8 sub-blocks, sub-block "I" of the target block matches sub-block "I" of the candidate block, for all I=0 through 7, inclusively (e.g., with zero-based sub-block notation).

Unfortunately, deduplication schemes using only full block or chunk deduplication fail to detect redundant data when blocks are similar but not identical. For example, a data storage system may store two target data blocks or chunks which only differ by only one sub-block or even a single bit or byte. Thus, using only full block or chunk deduplication, opportunities for deduplication of similar data blocks or chunks, but not full data block or chunk matches, are missed.

As mentioned above, another data reduction technique that may be used is data compression. In connection with data compression, the amount of data reduction achieved depends on, and varies with, the particular data blocks or chunks that may be compressed together as a single compressible unit. In particular, the amount of data reduction achieved in connection with compression varies with the amount of redundant data within the single compression unit.

To further reduce the consumed storage capacity, following paragraphs describe additional techniques that may be used in an embodiment. The techniques in following paragraphs may be used to identify data chunks or blocks that are similar but are not identified as complete or full matches. In at least one embodiment, two chunks or blocks that are similar means that both chunks or blocks include redundant data present in both chunks, and that both chunks may also include unique data not common or redundant to both chunks or blocks.

In at least one embodiment, a similarity measurement, such as a similarity hash computed using a similarity hash function (simhash) S described in more detail elsewhere herein, may be computed for each chunk or block. In at least one embodiment, if two chunks or blocks have similarity measurements that are within a specified threshold distance or difference of one another, the two chunks or blocks may be identified as similar to one another (e.g. having similar content or at least some content common to both chunks or blocks). More generally, in at least one embodiment two or more chunks or blocks may be identified as similar to one another if all such chunks or blocks have similarity measurements that fall within a specified threshold window or distance of one another. For example, a threshold window or distance denoting a maximum allowable distance may be defined and all chunks or blocks having associated similarity measurements within the threshold window or maximum allowable distance may be identified as similar to one another. Thus, an embodiment in accordance with the techniques herein may compute a similarity hash for each of the chunks or blocks and use such similarity hash values to determine whether the chunks or blocks are similar. Comparison of such similarity hash values provides for quicker more efficient comparison than, for example, comparing the data content of the chunks or blocks themselves to determine whether the chunks or blocks are similar in terms of content.

The similarity hash function S generates similar hash values for similar data chunks or blocks. The similarity hash function may be contrasted with other hash functions, such as the hash function 215 described above. For example, the hash function 215 as described above may be a cryptographic hash function that generates a hash value for a given input, where the hash values generated are randomly and uniformly distributed and uncorrelated to the particular inputs. In contrast, the similarity hash function S described in more detail elsewhere herein generates hash values that are correlated or related to the content of the input to S. Thus, the more similar the content of the data chunks or blocks, the closer the similarity measurements or hash values generated by S for such data chunks or blocks.

Generally, identifying similar chunks or blocks such as using the similarity hash values for such chunks or blocks has many suitable applications that may vary with embodiment. Also described in following paragraphs are some non-limiting uses of the techniques described herein.

In at least one embodiment, the techniques herein may be used to identify similar data blocks or chunks that may be compressed together as a single compressible unit. In such an embodiment, compression processing may be performed on similar chunks or blocks expected to have some matching or duplicate sub blocks among the chunks. The more similar blocks or chunks are to one another, the higher may be the expected compression ratio, and the greater the expected amount of data reduction achieved.

In at least one embodiment, the techniques herein may be used to identify similar data blocks or chunks in connection with identifying partial data deduplication candidates. For example, a target block or chunk may be stored in the deduplication database. The target block or chunk may denote a unique instance of data content stored in the deduplication database. A candidate block or chunk may be received and processing may be performed to identify which one or more target blocks are similar to the candidate block. If at least one target block is similar to the candidate block, the candidate block may be partially deduplicated with respect to the target block. For example, byte level or sub-block level comparison of the content of the target and candidate may be performed to determine the differences in data content between the target and candidate as well as the location of such differences. In at least one embodiment, the candidate block may be stored as a partially deduplicated version of the target block. When storing the candidate block as a partial deduplicated data block, reference may be made to the target block in combination with other metadata and data content identifying the differences between the candidate block and target block. For example, if only the first byte of the candidate block and the target block differ, the recorded or stored differences may identify the first byte location and also store the unique content of the first byte of the candidate. In this manner, the candidate block content may be formed using the content of the target block overwritten by the recorded or stored unique content of the first byte of the candidate block.

The foregoing and other aspects of the techniques herein are described in more detail in following paragraphs.

A data block or chunk as noted above is a unit of storage and may generally be any suitable size and may vary with embodiment. For example, the size of a data block or chunk may be 32 KB, 4 KB, 512 bytes, and the like. In at least one embodiment in accordance with the techniques herein described in following paragraphs, the block or chunk size may be 512 bytes in size.

A data block or chunk may be a buffer of data represented or further characterized as an integer having a binary representation. The integer may be a value in the range, inclusively, from 0 to MAXVAL, where MAXVAL is based on the size, such as the number of bytes, of the data block or chunk. For example, for a block or chunk size of 512 bytes, the block or chunk may be represented as an integer between 0 and $(2^{512*8}-1)$ having a binary representation. It is this binary representation of the data block or chunk and its integer value that may be used in connection with the techniques herein with the similarity hash function S to determine a similarity measurement or hash value for the data block or chunk.

An embodiment in accordance with the techniques herein may use a distance function to provide a measurement or degree of similarity between two data blocks. For example, in at least one embodiment, the Hamming distance $D(X,Y)=|\{i \in \mathbb{N}: 2^i \oplus X \oplus Y \neq 0\}|$ between two integers X and Y, and thus two data blocks or chunks represented as the two integers X and Y, may be defined to be the number of different bits in their binary, bitwise representations. $\oplus$ denotes the logical XOR (exclusive OR) operation that has a value of 1 or true when the two inputs are different, and a value of zero (0) or false otherwise. Thus, the XOR operation results in a 1 for a bit position for inputs (0, 1) and inputs (1, 0). As a simple example, assume that the chunk or block X has a first binary representation "0000 0011" and the chunk or block Y has a second binary representation "0000 0001", the Hamming distance D(X,Y)=1 indicating that there is 1 bit that is different with respect to the binary representations of X and Y, where X has a corresponding (base 10) integer value of 3, and Y has a corresponding (base 10) integer value of 1. The smaller the Hamming Distance D with respect to the inputs X and Y, the greater the similarity between X and Y and thus the closer X and Y are expected to be in terms of data content.

The similarity measurement or similarity hash (simhash) with respect to a data block or chunk P may be denoted as S(P). S may denote the similarity hash function, simhash, that is described in more detail elsewhere herein.

In at least one embodiment in accordance with the techniques herein, the Hamming distance D between two data blocks or chunks may also be determined with respect to hashes for the two data blocks or chunks. The hashes may be generated using a distance preserving hash function such as the similarity hash function simhash S described in more detail elsewhere herein.

Generally, to measure the Hamming distance D between two data blocks, a distance preserving hash function such as simhash S described herein may be used that preserves the distance property between data blocks or chunks such that the distance between the similarity hashes of the two blocks or chunks will correspond to the distance (e.g., similarity or differences) between the bits of the two blocks or chunks. The Hamming distance function D between the data blocks and the hashes of such data blocks preserves the relation between two pairs of data blocks with similar content to each other. For example, assume two blocks X and Y with bit contents b1 and b2 that are to be compared for similarities by measuring the Hamming distance D (b1,b2) between them. The distance preserving hash function, S, denoting simhash, may be used to compute the full chunk or block hashes that preserves the distance relation between D(b1,b2) and D(S(b1),S(b2)).

Generally, for the Hamming distance D with respect to two chunks or data blocks X, Y, the following is true:
1. D (X,Y)>0.
2. D (X,Y)=0 if, and only if X=Y.
3. D (X, Y)=D(y,x)

Furthermore for an additional data block Z,
4. D (X,Y)<D (X,Z)+D (Z,Y)

In connection with the techniques herein where D is determined with respect to data blocks X and Y, Z may be any arbitrary data block in the same data space as the data blocks X and Y.

In a similar manner, using the distance preserving hash function simhash S, the hash values S(X) and S(Y) may be used to determine the Hamming Distance D with respect to the S(X) and S(Y). In such an embodiment, the Hamming distance D may be computed using S(X) and S(Y) rather than computing the Hamming distance D using X and Y. Such a computed Hamming distance D with respect to S(X) and S(Y) may be used to draw an inference about the similarities within the two blocks (e.g., regarding the data content of the 2 blocks) without comparing the contents of the two blocks X and Y.

If (b1, b2 and b3) are three blocks of the same size; and $D_{12}$ and $D_{13}$ are the corresponding distances of each pair, where $D_{12}=D$ (b1,b2) is the distance between b1 and b2, and $D_{13}=D$(b1, b3) is the distance between b1 and b3, then a distance preserving hash function simhash, S, may be defined to determine hash values for all 3 blocks, b1, b2, and b3 where:

S1=S(b1) is the computed hash for b1 using the hash function S;

S2=S(b2) is the computed hash for b2 using the hash function S;

S3=S(b3) is the computed hash for b3 using the hash function S;

$d_{12}$=D(S1, S2) and $d_{13}$=D(S1, S3) (e.g., distances between hash values); and if $d_{12} < d_{13}$ then $D_{12} < D_{13}$ Thus, the distance preserving hash function S, denoting simhash, has the property:

if $d_{12} < d_{13}$ then $D_{12} < D_{13}$ whereby simhash S preserves the distance relation between the data blocks (e.g., D(b1, b2)) and the hash values of such data blocks (e.g., D(S(b1), S(b2))). In other words, the relative distance between blocks are preserved when computing the distance using the calculated hash values using simhash, S, for such blocks.

The similarity hash function S described in following paragraphs may be used to efficiently compute S(P) for a chunk or data block P. The techniques described herein provide for clustering together chunks or data blocks expected to contain similar content based on the similarity measurements or hash values determined with S.

A majority (maj) function or operation may be defined with respect to a sequence of "n" bits that outputs a single bit value or 0 or 1. The value of maj is true or 1 when n/2 or more of the n bits are 1 or true false, and the value of maj is false or 0 otherwise. More formally, the maj operation on the sequence of n bits may be expressed as in EQUATION 1 below:

$$maj(b1, \ldots, bn) = \begin{cases} 1 & \text{if the number of 1s in } (b_1, \ldots b_n) > \frac{n}{2} \\ 0 & \text{otherwise} \end{cases}$$ EQUATION 1

In EQUATION 1, b1 . . . bn denotes the sequence of "n" bits or binary input values and each of b1 through bn is either 0 or 1.

It should be noted that EQUATION 1 determines a majority value, sometimes referred to as a bitwise majority, regarding the n bits. In at least one embodiment, the bitwise majority maj for "n" bits may be determined by counting the number of bit values=1 and determining a sum. If the sum is greater than or equal to "n/2", then the bitwise majority maj for the n bits=1; otherwise maj for the n bits=0. In at least one embodiment, the number of bits n may be even.

As noted elsewhere herein, the simhash function S for a data block or chunk P may be denoted as S(P). The binary representation of P may be used in connection with forming features for P. Each feature is formed from bits of P. The bits may correspond to bit values for different bit positions in the binary representation of P. In at least one embodiment and examples described herein, each feature may be a different byte or 8 consecutive bits of P.

Generally, in at least one embodiment where each feature is a byte, the simhash, similarity hash value or similarity measurement for P determined using the similarity hash function S may include partitioning the binary representation of the block or chunk P into corresponding bytes, determining a hash (also sometimes referred to as a byte hash or more generally feature hash) for each of the bytes using a hash function H, and taking the bitwise majority for each bit position of the byte level hashes. When determining the hash for each of the bytes using H, inputs to the hash function H may include the bits of P forming the particular byte as well as a salt value based on an index denoting the byte location or position in the chunk or block P. In at least one embodiment, each byte fj of P may have a unique index j denoting that particular byte with respect to all other bytes formed from bits of P. Additionally, in at least one embodiment, the salt value for a byte fj may be "j", where j is the unique byte index. The foregoing is described in more detail in following paragraphs.

Also, as noted above, description herein may provide examples where each feature is a byte. However more generally, each feature may be any suitable size or number of bits.

As a first step in connection with determining S(P), the bit representation of the chunk or block may be partitioned into features formed from sequential consecutive bytes of P where each feature is a byte. Each byte is formed the next sequential consecutive 8 bits from the block or chunk P.

Figure 3:
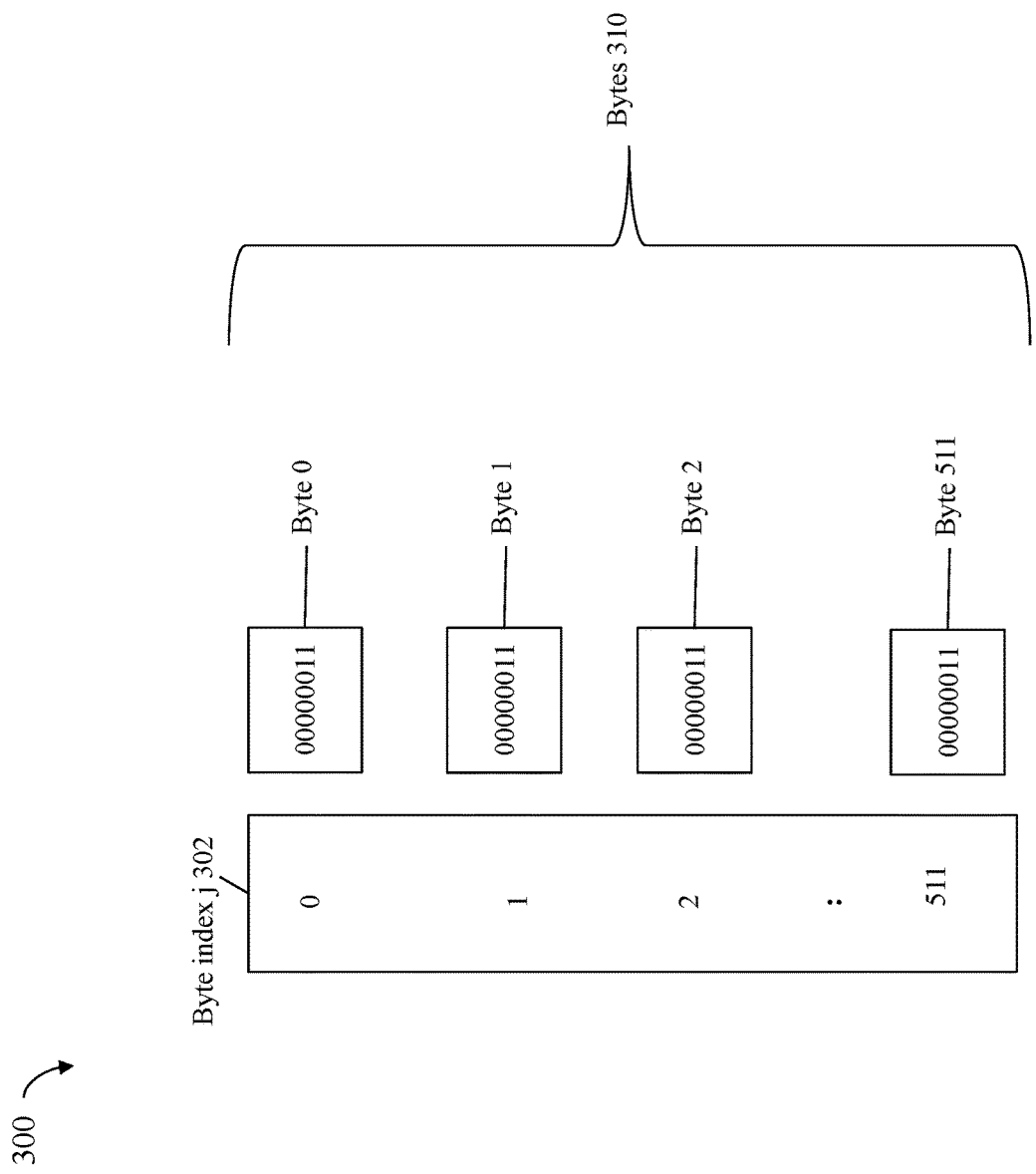
FIG. 3 is an example illustrating bytes of a chunk or block in an embodiment in accordance with the techniques herein.

Referring to FIG. 3, shown is an example illustrating bytes of a block or chunk P in an embodiment in accordance with the techniques herein. The example 300 illustrates N=512 bytes of the chunk P. Element 302 denotes the unique byte index j 302 associated with each of the 512 bytes of P.

In at least one embodiment as illustrated in FIG. 3, the binary representation of the chunk or block P may be viewed as a sequential stream of consecutive bits and bytes. Further each byte may be formed from a next sequence of 8 consecutive bits of P. In such an embodiment, P may be partitioned into bytes where each bytes includes 8 consecutive bits of P. For example, for the 512 bytes of 310, byte 0 may include the first 8 bits, bytes 0-7, of P; byte 1 may include the next 8 bits, bits 8-15 of P; byte 3 may include the next 8 bits, bits 16-23, of P, and so on, for all 512 bytes of P.

Subsequent to partitioning P into bytes in the first step, a second step may be performed. The second step may include determining, for each byte, a byte hash that is a hash value based on the content or bits of the byte. In particular, the hash value for a byte fj may be based on the binary representation of the byte fj. The byte hash may be determined using the hash function denoted as H where H may be any suitable hash function that randomly generates a hash value for a given input. The hash values generated by H are thus randomly distributed and approximate an even or uniform distribution of hash values. Consistent with other discussion herein, with H, there is no correlation between the input and a hash value generated by H for the input. Thus, the Hamming distance D between 2 hash values generated using H for two corresponding inputs is uncorrelated with respect to the two corresponding inputs. For example, the Hamming Distance D between the 2 hash values is independent of the similarity or differences with respect to the 2 corresponding inputs. H may be, for example, a cryptographic hash function (e.g., MD-5, SHA-1, SHA-2), may be hash function 512 as described in connection with FIG. 2A, and the like.

The second step may include determining a byte hash for byte fj based on inputs including the content or the binary representation of the byte fj and also the salt value, "j", corresponding to the unique index associated with the byte fj. As noted elsewhere herein, in at least one embodiment, the index j for byte fj may correspond to the byte position within the block or chunk. In this manner, two bytes having identical content but a different byte index have different hash values generated by H.

Consistent with other discussion herein, the techniques herein use a value denoted as a salt value may be provided as another input to the hash function H along with the byte fj when determining hj. In at least one embodiment, the salt value may be generally based on the byte index "j" associated with the byte also provided as input to the hash function H.

An embodiment may generally combine or use the salt value "j" with the byte fj in any suitable manner with H. In at least one embodiment, input to the hash function H when computing hj for the byte j includes the binary representation or integer value of the byte j, and the integer value of "j". The value of "j" or salt value may be combined or used with the data of byte j in any manner by the hash function H when computing hj. For example, an embodiment may determine a bit representation R for the integer value of "j" and then concatenate, add, or perform some other operation between R and with the bit representation of the byte fj.

In connection with the example described herein, assume that each hash value hj generated for byte fj by the hash function H is 32 bits and may be expressed as:

$$hj = H(fj, j) \quad \quad \text{EQUATION 2}$$

Figure 4:
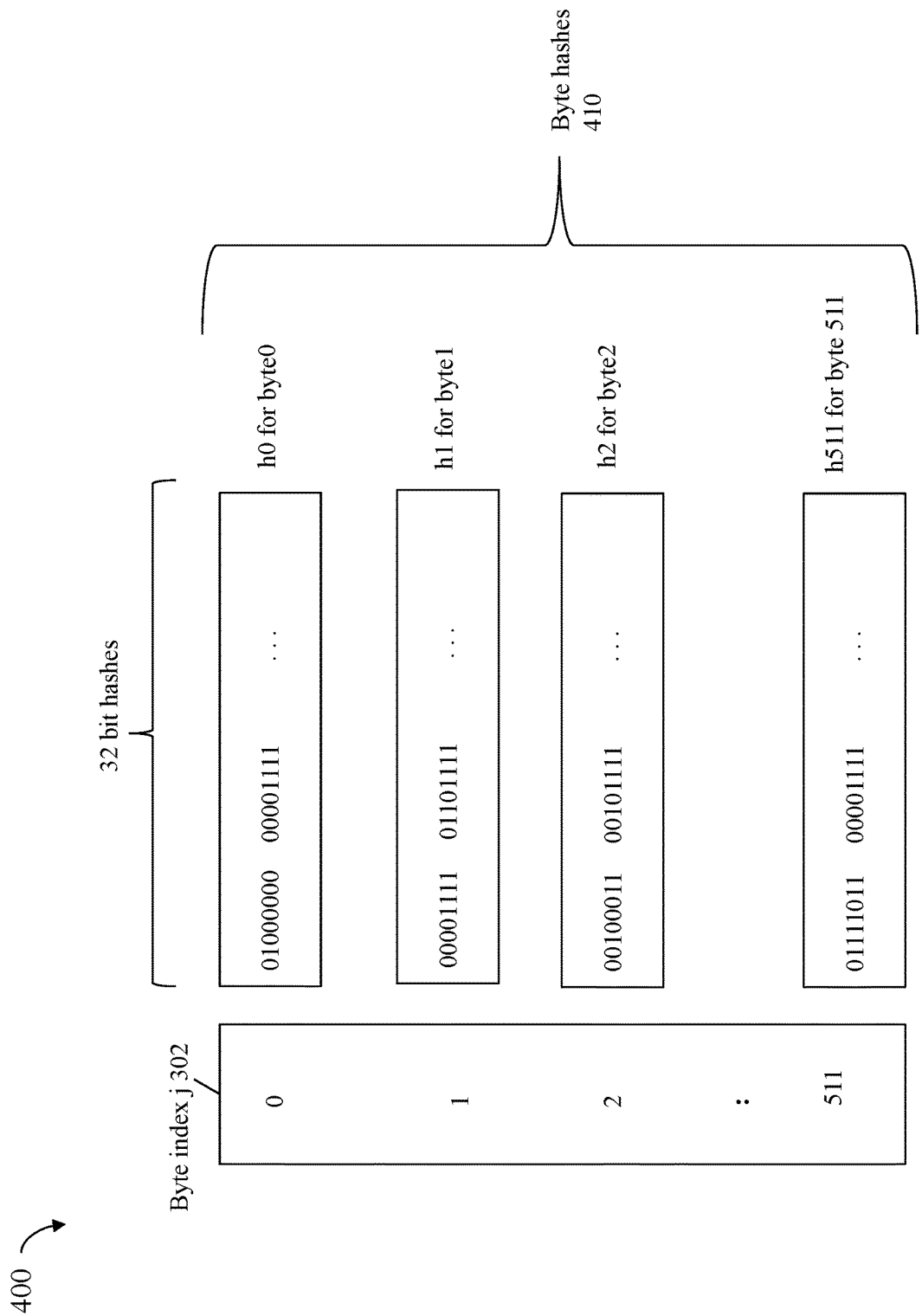
FIG. 4 is an example illustrating hashes formed for the bytes of a chunk or block in an embodiment in accordance with the techniques herein.

Referring to FIG. 4, shown is an example of the byte hashes generated using H after completion of the second step in at least one embodiment in accordance with the techniques herein. The example 400 includes byte index 302 denoting the different bytes 0 through 511. Element 410 denotes the 512 byte hashes h0 through h511 computed, respectively, for the bytes 0 through 511 using H in the second step described herein. In this example 400, each of the byte hashes 410 may be 32 bits since, for example, the particular hashing function H may generate 32 bit hash values.

Subsequent to completing the second step in which the byte hashes are computed, a third step may be performed. In the third step, the bitwise majority (maj) is determined for each of the bit positions of the byte hashes. With reference to FIG. 4, 32 bitwise majorities are determined for the 32 bits of the byte hashes 410. For example, each byte fj has an associated hash value hj (e.g., hj=H(fj, j)) that is 32 bits. In this case, the byte hashes each include 32 bits having corresponding bit positions 0 through 31, inclusively. In this case, a first bitwise majority is determined for with respect to all 512 byte hashes for hash bit position 0 based on the 512 bit values of hash bit position 0 of the 512 byte hashes 410; a second bitwise majority is determined for with respect to all 512 byte hashes for hash bit position 1 based on the 512 bit values of hash bit position 1 of the 512 byte hashes 410; and so on, for all 64 bit positions of the byte hashes. The bitwise majority, maj, for each of the bit positions 0 through 64 of the byte hashes may be computed as denoted by EQUATION 1.

To further illustrate with respect to the 512 byte hashes 410, assume that bit position 0 in 500 of the byte hashes 410=0, and that bit position 0 in the remaining 12 byte hashes of 410=1. In this case, the bitwise majority for bit position 0 of the byte hashes 410 is 0 (e.g., 500 occurrences=0 and 12 occurrences=1). Further, assume that bit position 1 in 500 of the byte hashes 510=1, and that the remaining 12 of the bytes hashes of 410=0. In this case, the bitwise majority for bit position 1 of the byte hashes 410 is 1 (e.g., 500 occurrences=1 and 12 occurrences=0). In a similar manner, the bitwise majority is determined for the remaining bit positions 2 through 31 of the byte hashes 410.

Thus, the output of the third step is a 32 bit value denoting S(P), the similarity hash or similarity measurement for the block or chunk P. More generally, S(P) has a value that is the size or number of bits of each of the byte hashes of 410. Each bit of S(P) having a corresponding bit position V is computed as the bitwise majority based on the bits of bit position V of the byte hashes 410.

Below is a pseudo-code like representation summarizing the above description for computation of a similarity hash S for a block or chunk P of N bytes. Below P is represented as having N bytes in an array with indices 0 through N−1 with a single byte of P stored in each cell or entry of the array X. Thus, P is represented as array X of size N [x0, x1, x2 . . . $x_{N-1}$]

and where the similarity hash S for P may be determined as described by:

```
For each xi in X, i ranging from 0 through N-1  /* compute hashes for each byte */
      h [i] = H(xi, i);              /** H is any uniform distribution hash function */
For jj=0 through B       /** B is the of bits in each hash value generated by H
                         /**     and there are B bits in the similarity hash S.
                         /**     Count the number of 1's in each bit position jj and
                         /**     store the sum in count[jj]*/
      count[jj]=total number of bits in bit position "jj" of all hash values that are '1';
For jj=0 through B       /* determine bitwise majority maj for each bit position jj of
                         /* The similarity hash S for the block P represented as X
      If count[jj] > (N/2) then     /* if more 1's than 0's in bit position jj of hashes
         Bit position "jj" of the similarity hash S(P=X) = 1
      Else
         Bit position "jj" of the similarity hash S(P=X) = 0
```

Figure 5:
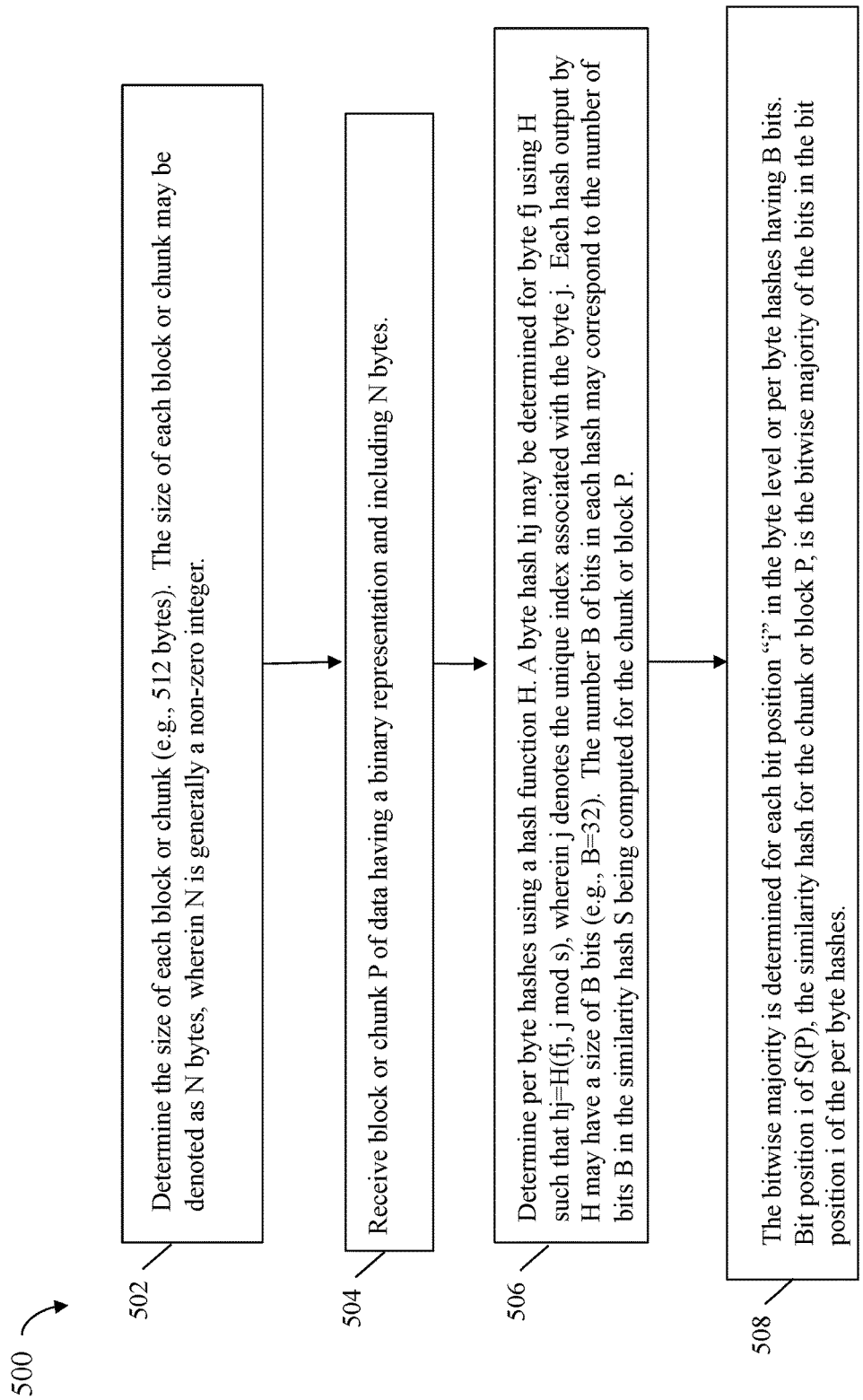
FIGS. 5, 9, 13, 14, 15, 16, 17 and 18 are flowcharts of processing steps that may be performed in an embodiment in accordance with the techniques herein.

Referring to FIG. 5, shown is a flowchart summarizing processing steps for determining the similarity hash S for a block P in an embodiment in accordance the techniques herein. The flowchart 500 generally summarizes processing described above and also represented in the above-noted pseudo-code description.

At the step 502, processing may be performed to determine the size of each block or chunk (e.g., 512 bytes). The size of each block or chunk may be denoted as N bytes where N may generally be any suitable non-zero integer. From the step 502, control proceeds to the step 504.

At the step 504, a chunk or block P is received having a binary representation that is used to form bytes of the chunk or block P. From the step 504, control proceeds to the step 506.

At the step 506, processing is performed to determine the per byte hashes using a hash function H. A byte hash hj may be determined for byte fj using H such that hj=H(fj, j), wherein j denotes the unique index associated with the byte j. From the step 506, control proceeds to the step 508.

At the step 508, processing may be performed to determine the bitwise majority for each bit position "i" in the byte hashes. Bit position i of S(P), the similarity hash for P, is the bitwise majority of the bits in the bit position i of the byte hashes. Thus, at the completion of the step 508, S(P), the similarity hash for the block or chunk P, has been determined.

The flowchart of FIG. 5 includes the steps 504, 506 and 508 performed for a single block or chunk P. More generally, such processing may be repeated to determine similarity hashes for other blocks or chunks.

In connection with performing the computations for determining a similarity hash value S(P) for a data block or chunk P, the amount of computing resources consumed may be undesirably high. As a result, techniques described in following paragraphs may be used to determine similarity hashes in an efficient manner.

In at least one embodiment in accordance with the techniques herein, one or more tables may be used to store predetermined or precomputed hash values computed by H. In at least one embodiment, a single 3 dimensional table may be used. In at least one embodiment, N tables may be used, where each of the N tables are 2 dimensional tables, and where N denotes the number of bytes in a single block or chunk P for which the similarity hash S(P) is determined. In at least one embodiment, each entry of the table may be a byte in size used to store a value corresponding to a single bit of a precomputed hash value stored in the table. Each entry of the table may have a value of either 0 or 1 representing a single bit value of a precomputed hash value stored in the table. For example, a 32 bit hash value may be stored in 32 cells or entries of the table.

In at least one embodiment, processing may be performed to efficiently compute the bitwise majority for a bit position of the similarity hash function S determined with respect to the same bit position in all the hash values of bytes of a block P. In at least one embodiment, the bitwise majority operation maj may be performed using vectorized operations or instructions included in the instruction set of a system upon which the techniques herein are performed.

An embodiment in accordance with techniques herein may utilize any suitable instruction set and computer architecture available that may vary with the system and platform used for implementation. For example, an embodiment in accordance with techniques herein may be performed by executing code in a system using one or more CPUs and the x86 instruction set and architecture by Intel®. An embodiment may, for example, utilize the Advanced Vector Extensions (AVX) of the x86 instruction set architecture (ISA) for microprocessors from Intel®, such as Intel® Advanced Vector Extensions 2 (Intel® AVX2) or Intel® Advanced Vector Extensions 512 (Intel® AVX-512). Generally, AVX are extensions to the x86 architecture where, for example, the Intel® AVX2 instruction set operates on 256 bit wide registers and the Intel® AVX-512 instruction set operates on 512 bit wide registers. Generally, as known in the art, the AVX instructions are also characterized as single instruction multiple data (SIMD) instructions that provide for increased processor throughput by performing multiple computations in a single instruction.

In at least one embodiment, the techniques herein may utilize the extended register set available, such as in the Intel®AVX2 and Intel® AVX-512 instruction sets, where the number of available registers as well as extended larger size of each register allows for more efficient vectorized instruction sets. The techniques herein may utilize the extended larger size of each register that allows for storing in a single register multiple values upon which computations are performed.

The following paragraphs may reference particular instruction sets, CPU register sizes (e.g., number of bits of each register), number of available registers, and counter sizes (e.g., number of bits in each counter value) to illustrate use of techniques herein. For example, an embodiment using the extended register set of an Intel AVX® architecture may use YMM registers, where each YMM register is 256 bits wide, or XMM registers, where each XMM register is 128 bits wide. As known in the art, XMM registers represent the lower 128 bits of the YMM registers. However, techniques here may generally be used with any suitable instruction set, number of registers, register size and counter size such as, for example, where multiple counters may be stored into a single register. For example, techniques herein may also be used in connection with a suitable RISC ISA, where a single register has a sufficient number of bits for storing multiple counters.

The foregoing and other aspects of the techniques described herein are set forth in more detail in following paragraphs.

An embodiment in accordance with the techniques herein may store precomputed hash values in one or more hash tables.

In at least one embodiment, a single 3 dimensional table may be used to store precomputed hash values for N bytes of content of the block or chunk P for which the similarity hash S(P) is being computed. Each hash value may have K bits and there are 256 possible byte values. In at least one embodiment described herein, each cell or entry of the table may be a byte, K may be 32 bits and N may be 512. In such an embodiment, the memory required to store the precomputed hash values may be generally expressed as N*256*K bytes. In connection with the example in which K=32 and N=512, the memory required to store the table of precomputed hash values is 512*256*32=4 MB of memory.

As described elsewhere herein, each hash value computed by H may be based on 2 inputs—the integer value of a particular byte j of P, and the index j identifying the byte position in P at which byte j is located. In such an embodiment, each precomputed hash value is determined based on the foregoing inputs and the hash value output by the hash function H may be stored in the appropriate cells or entries of the table.

In at least one embodiment using a single 3 dimensional table, the following may represent the organization with respect to the different dimensions and associated indices:

Table[byte index][byte value][K]

Where, for a byte j:
byte index identifies the particular index associated with the byte and is a value between 0 and N−1;
byte value denotes the integer value of the contents of the byte j (e.g., a positive integer in the range of 0 through 255 since a byte is 8 bits); and
K denotes the number of bits in each hash value.

In at least one embodiment using a 3 dimensional table, each row of the table may be a representation of a single precomputed hash value stored in the table.

As a variation to implementing the table as a 3 dimensional table, the table may be implemented as N, 2 dimensional tables, where each of the N tables includes precomputed hash values stored for a particular byte index j. In such an embodiment, table 0 may store all precomputed hash values for byte 0 of the block P; table 1 may store all precomputed hash values for byte 1 of the block P; and so on for all N bytes and N indices. In such an embodiment, each row of the N tables may include a representation of a single precomputed hash value.

Figure 6:
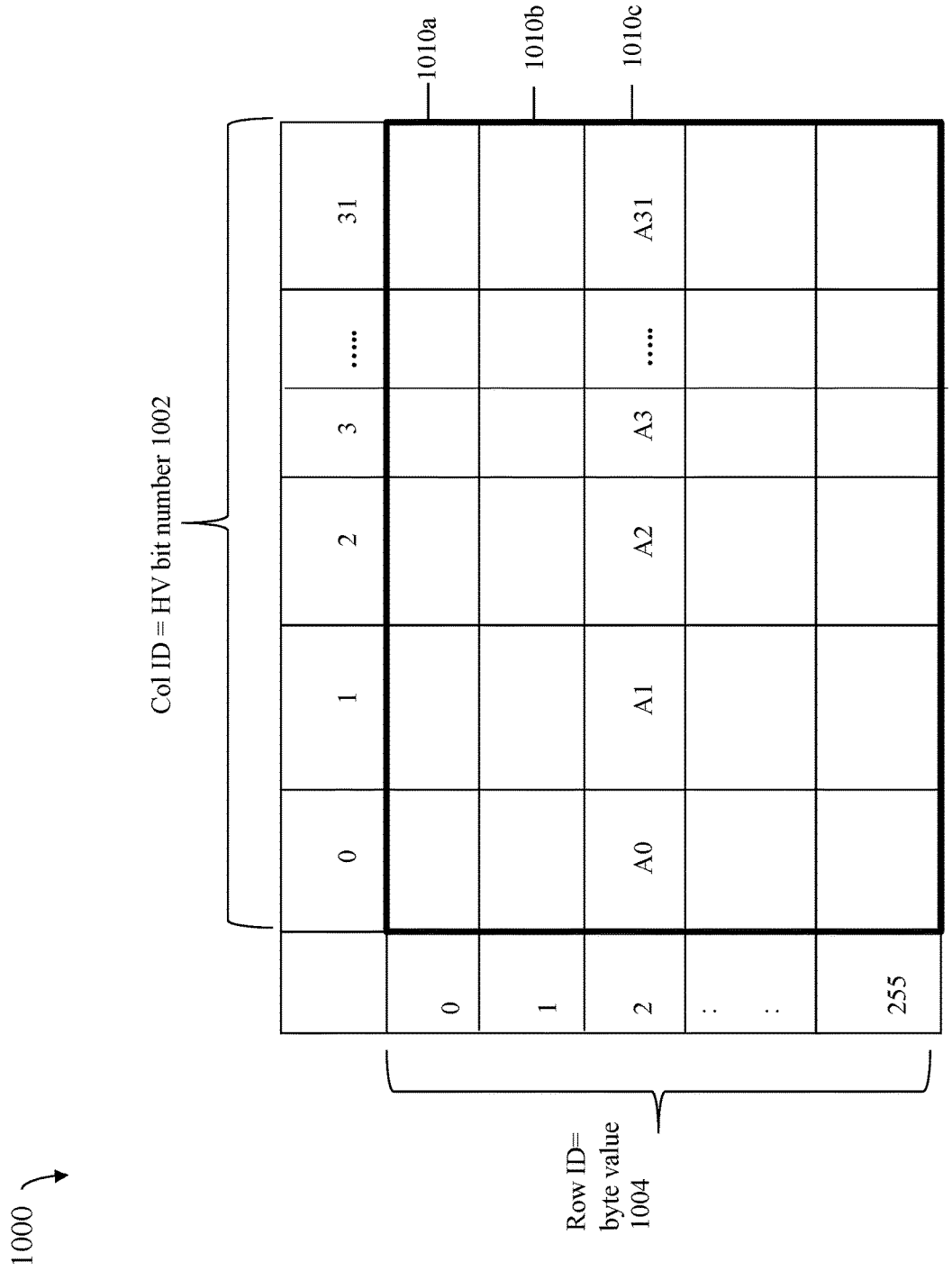
FIGS. 6 and 11 are examples illustrating tables of pre-computed hash values that may be used in an embodiment in accordance with the techniques herein.

For example, reference is made to FIG. 6 illustrating the layout of a single one of the N tables in at least one embodiment in accordance with the techniques herein. The example 1000 indicates that the column identifier (ID) corresponds to a hash value (HV) bit, and the row ID corresponds to the byte value of the byte j. For example, for byte j, where j is the index of the byte in P and j is in the range 0-N−1, table j may be selected from the N tables. Each of the N tables may have dimensions and organization as illustrated in the example 1000 of FIG. 6. Each row of the table, such as each of the rows 1010a-c, may store a representation of a single hash value. Each entry or cell of the table 1000 may be a byte in size and have a value of either 0 or 1 to encode the bit value of a single bit of a hash value. For example, consider j=0 identifying the first byte of P. The first byte 0 of P may be any integer value in the range 0-255. Each row of the table 1000 stores a representation of a hash value corresponding to one of the possible 256 values (from 0-255) for the byte 0. Each HV may be 32 bits in size. In this case, column 0 of the table 1000 stores the bit values (e.g., 0 or 1) for bit 0 of each HV; column 1 of the table 1000 stores the bit values (e.g., 0 or 1) for bit 0 of each HV; column 2 of the table 1000 stores the bit values (e.g., 0 or 1) for bit 2 of each HV, and so on.

For example, assume that processing is performed to initialize the N tables and store precomputed hash values. Assume that processing is performed to compute and store the hash values for byte 0, where j=0. In this case, table j=0 is utilized to store the hash values for byte values 0-255. Assume that processing is performed to compute the hash value for byte 0 when byte 0 has a value of 2 (e.g. bit representation "0100000"). Assume that the computed hash value HV=H(byte value=2, j=0), is 7 having a corresponding bit representation of "11100000 00000000 00000000 00000000". In this case for byte value=2, row 2 1010c of the table is used to encode and store a representation of the HV=7. In this example, bits 0-2 of the computed HV of 7 are 1, and all other bits of the HV 7 are 0. A single bit of the HV may be encoded in a single entry or cell. Thus, entries A0-A3 in the row 1010c each have a value of 1, and the remaining entries A3-A31 of the row 1010c each have a value of 0. In this manner, each bit of each hash value is stored in a single byte or entry of the table 1000.

In following paragraphs, reference is made to the particular non-limiting example where the precomputed hash values are stored in N tables.

In at least one embodiment, the N tables may be initialized with precomputed hash values as just described. The N tables containing the precomputed hash values may be stored, for example, in memory of the system. The N tables storing the precomputed hash values may be stored, for example, on non-volatile backend physical storage of PD. In at least one embodiment, the N tables storing the precomputed hash values may be loaded into memory from the physical storage location of the PD prior to performing processing that computes a similarity hash value S(P) for a block or chunk P. As a variation in at least one embodiment, rather than store the precomputed hash values in the N tables on a backend PD, the N tables may be initialized when the system is booted, at which time processing may be performed to initialize the N tables with the hash values for later use.

What will now be described is processing that may be performed using the N tables storing the precomputed hash values in connection with computing a similarity hash S(P) for a block or chunk P. In connection with such processing described below, assume that each hash value is 32 bits and that the block P has 512 bytes.

Figure 11:
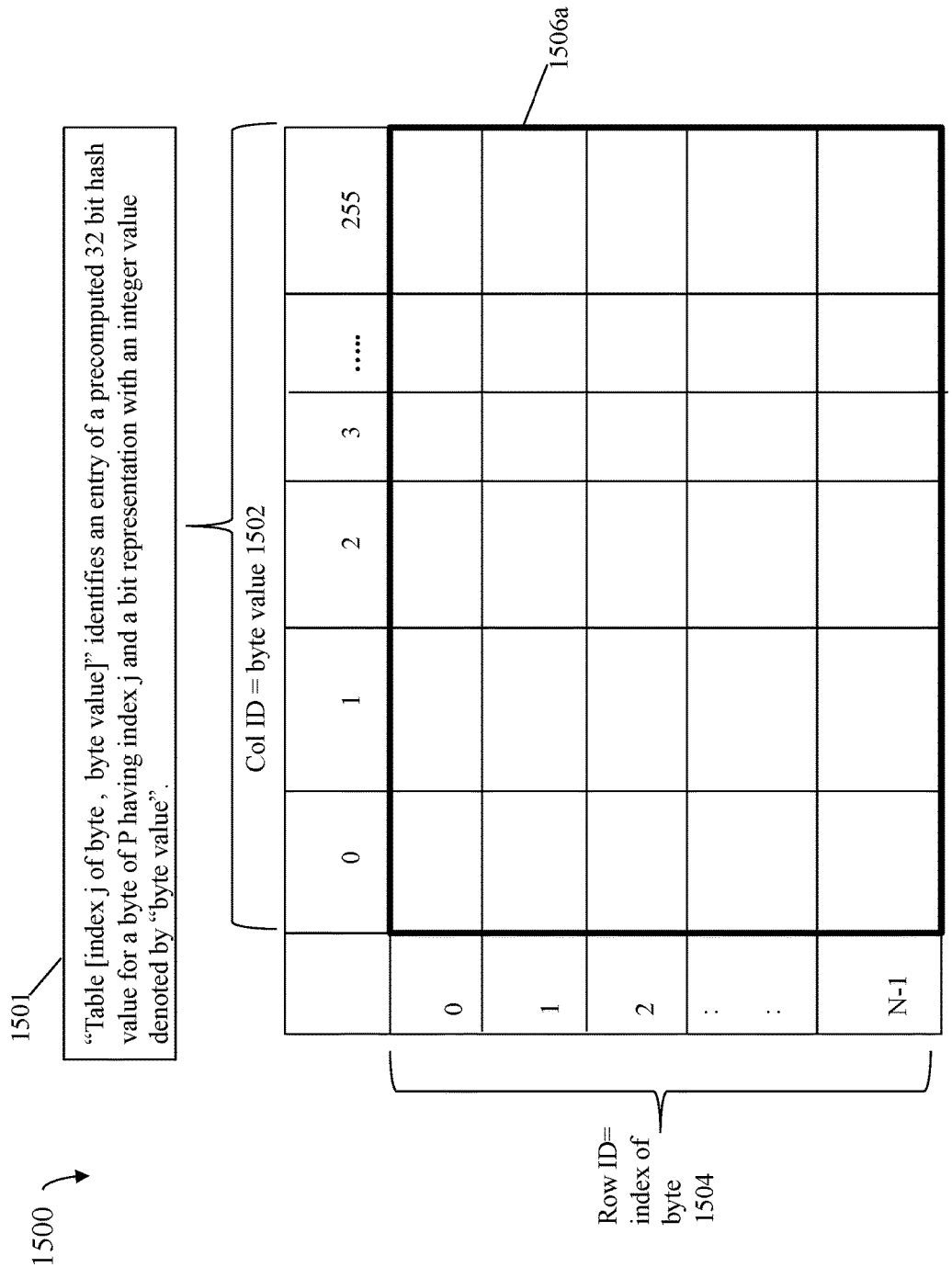

Referring to FIG. 11, shown is an example 1100 illustrating hash values selected from the N tables for bytes of the block P. Consistent with discussion herein, hash values for each the 512 bytes of P may be determined by looking up the hash value in a first of the N hash tables determined in accordance with the index j of the byte. A particular row in the first hash table may be determined in accordance with the byte value of the byte. The particular row includes a representation of the 32 bit hash value for the byte.

As illustrated by 1104, for a byte j of P, wherein j is the index of the byte, and byte value denotes the integer value (e.g., in the range 0-255) of the bit representation of the byte, table [j, byte value] identifies a row of 32 byte entries in table j representing a precomputed hash value for byte j.

Element 1102 includes the 512 bytes of P for which hash values are determined using the N tables of precomputed hash values. Element 1106a is byte 0 of P having a byte value of 10. Element 1106b represents the hash value HV0 for byte 0 1106a obtained from row 10 of table 0. Element 1108a is byte 1 of P having a byte value of 7. Element 1108b represents the hash value HV1 for byte 1 1108a obtained from row 7 of table 1. Element 1110a is byte 2 of P having a byte value of 8. Element 1110b represents the hash value HV2 for byte 2 1110a obtained from row 8 of table 2. Element 1112a is byte 511 of P having a byte value of 0. Element 1112b represents the hash value HV511 for byte 1 1108a obtained from row 0 of table 511. In a similar manner, a hash value may be determined for each of the 512 bytes of P 1102. In this example, each of the 512 hash values for the 512 bytes of P 1102 is stored in a row of one of the tables. Each of the 512 hash values for bytes of P is represented in a row of 32 byte entries.

Processing may be performed to add the 512 hash values, HV0-HV511. In at least one embodiment, vectorized instructions may be used which operate on registers having a size such as 256 bits. In connection with one of the vectorized instructions, the register may be configured as a vector of multiple elements. For example, a 256 bit register may be configured to have 32, 8 bit elements for use in connection with the techniques herein.

In following paragraphs processing of the techniques herein are illustrated with respect 256 bit registers that may be used with vectorized instructions. More generally, any suitable and supported register size may be used with the techniques herein.

HV0 1106b may be loaded (load 0 1120a) using a vectorized load instruction into register 0 1106c. The register 0 1106c may be a 256 bit register configured to store 32, 8 bit elements. The vectorized load 1120a loads the 32 bytes of HV0 1106b into corresponding 32 elements of register 0 1106c.

HV1 1108b may be loaded (load 1 1120b) using a vectorized load instruction into register 1 1108c. The register 1 1108c may be a 256 bit register configured to store 32, 8 bit elements. The vectorized load 1120b loads the 32 bytes of HV1 1108b into corresponding 32 elements of register 1 1108c.

Figure 7:
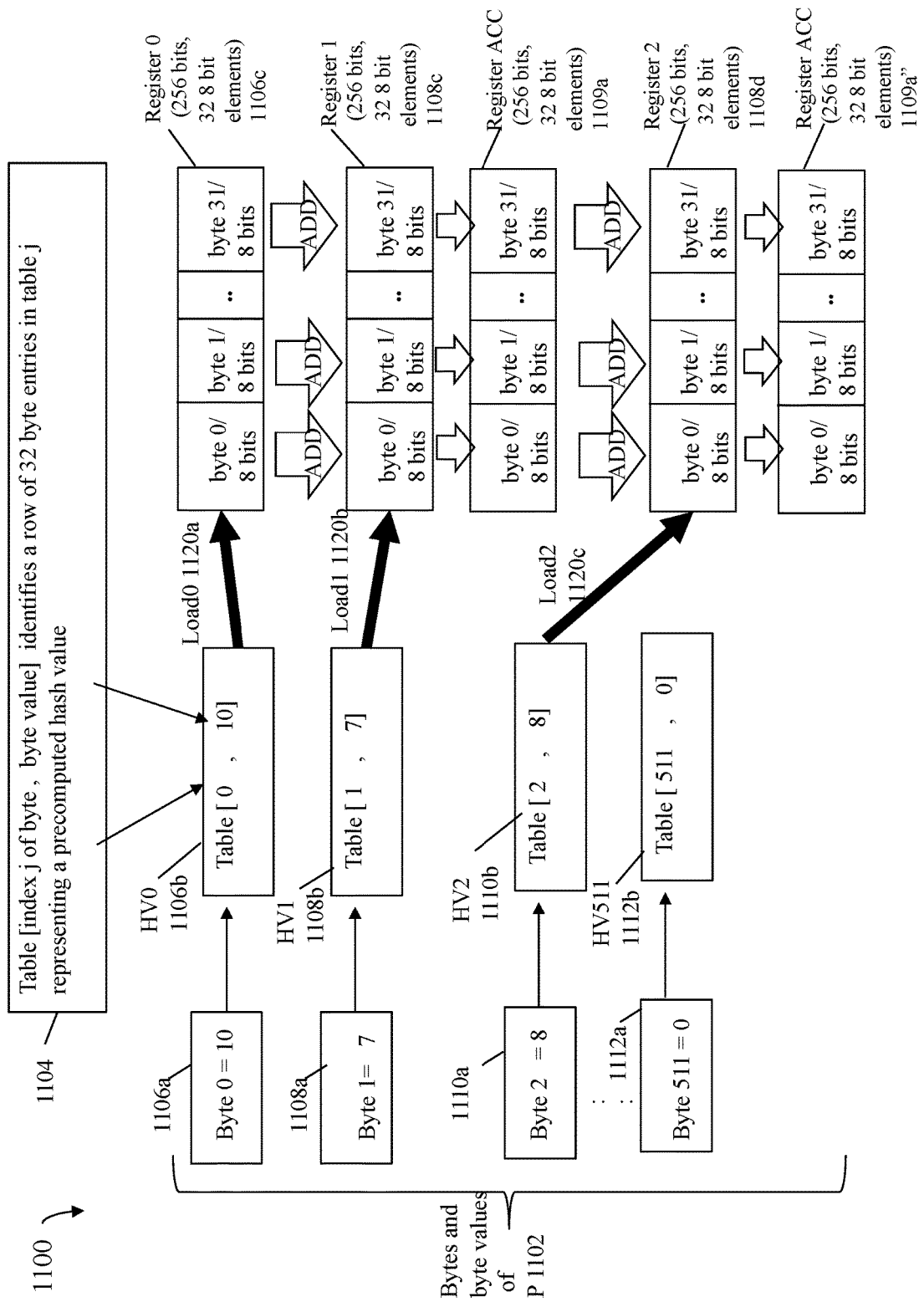
FIG. 7 is an example illustrating loading and adding hash values in an embodiment in accordance with the techniques herein.

Once registers 1106c and 1108c have been respectively loaded with HV0 1106b and HV1 1108b, a vectorized add instruction may be executed to add corresponding 8 bit elements of the registers 1106c and 1108c together. The results of the vectorized addition may be stored in ACC 1109*a* that is configured to store 32, 8 bit elements. For example, as illustrated in FIG. 7, byte 0 or element 0 in register 0 1106*c* may be added to byte 0 or element 0 of register 1 1108*c*. The resulting sum of the foregoing byte level addition for byte 0 may be stored in byte 0 of the accumulation register ACC 1109*a*. Generally, byte j configured as element j in register 0 1106*c* may be added to byte j configured as element j of register 1 1108*c*. The resulting sum of the foregoing byte level addition for byte j may be stored in byte j of the ACC 1109*a*.

The next HV2 1110*b* may be loaded (load 2 1120*c*) using a vectorized load instruction into register 2 1108*d*. The register 2 1108*d* may be a 256 bit register configured to store 32, 8 bit elements. The vectorized load 1120*c* loads the 32 bytes of HV2 1110*b* into corresponding 32 elements of register 2 1108*d*.

Once load 2 1120*c* is complete, a vectorized add instruction may be executed to add 32 corresponding 8 bit elements of the registers 1109*a* and 1108*d* together and store the resulting 32 sums in corresponding elements of the ACC register 1109*a*. For example, as illustrated in FIG. 7, byte 0 or element 0 in register 1109*a* may be added to byte 0 or element 0 of register 2 1108*d*.

The resulting sum of the foregoing byte level addition for byte 0 may be stored in byte 0 of the accumulation register ACC 1109*a*. Generally, byte j configured as element j in register 1109*a* may be added to byte j configured as element j of register 2 1108*d*. The results of the vectorized addition may be stored in the register ACC 1109*a*. Element 1109*a*" denotes the resulting updated contents of the register ACC 1109*a* after performing the vectorized addition of register 2 1108*d*.

In a similar manner, each of the remaining hash values HV3-HV511 may be loaded into a register using a vectorized load instruction, where the register is then added, using a vectorized add instruction, to the ACC register 1109*a*. The resulting sum of each vectorized addition may be stored in the ACC register 1109*a*. Thus, ACC register 1109*a* is a running sum of the 32 byte elements. Each 8 bit element of the ACC 1109*a* may correspond to a different one of the K bit positions in the hash values and also the similarity hash S(P).

Since each of the 32 elements of the ACC register 1109*a* is 8 bits or 1 byte, each element may store a bit representation of an integer value in the inclusive range 0 through 255. Thus the largest integer value that can possibly be represented by a byte or a single element in the ACC register 1109*a* is 255. However, as in the current example with 512 bytes in P, there may be more than 255 HVs to be added together. Therefore prior to adding the 256$^{th}$ HV to ACC 1109*a*, processing may be performed to avoid any possible overflow of any of the elements of the ACC register 1109*a*.

Figure 8:
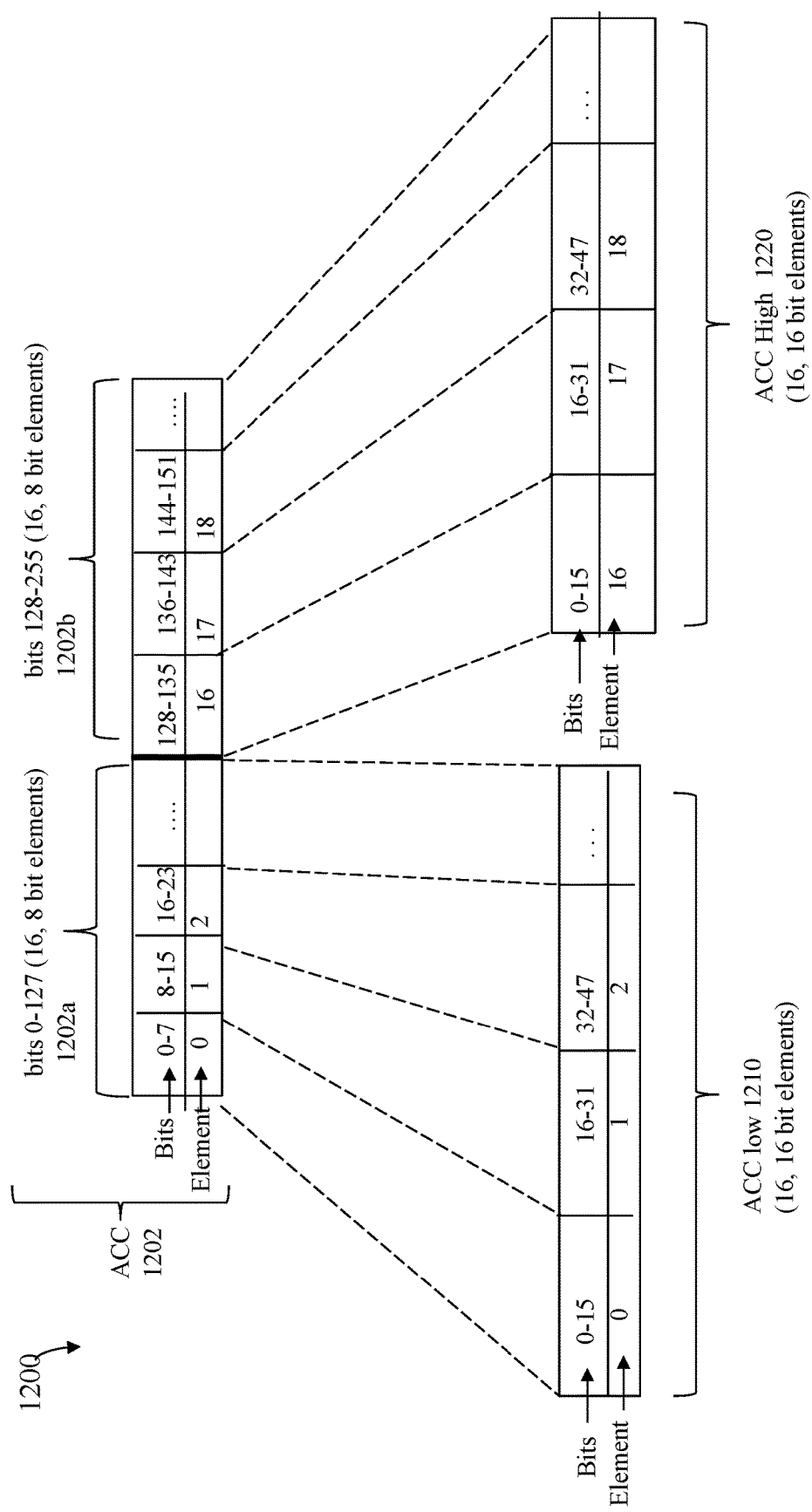
FIG. 8 is an example illustrating partitioning the elements of the accumulator or accumulation register to avoid possible counter overflow in an embodiment in accordance with the techniques herein.

What will now be described with reference to FIG. 8 is processing that may be performed in at least one embodiment in order to avoid possible overflow of the elements of the ACC register 1109*a*.

In FIG. 8, the ACC 1202 corresponds to the ACC register 1109*a*, 1109*a*" of FIG. 7. The ACC 1202 may be configured to store 32, 8 bit elements, where each of the 32 elements corresponds to a counter counting the number of 1 bit values in one of the bit positions of the HVs and S(P). To avoid possible counter overflow by elements of the ACC 1202, once the 255th HV has been added to ACC 1202, processing may be performed to partition the 256 bits and 32 elements of the ACC 1202 into 2 equal portions 1202*a*, 1202*b*. Each of the portions 1202*a*, 1202*b* includes 16, 8 bit elements of the ACC 1202. Portion 1202*a* may denote the low portion of the elements or bits of the ACC 1202, and 1202*b* may denote the high portion of the elements or bits of the ACC 1202.

The portion 1202*a* may be added to a first additional accumulation register ACC low 1210 using a vectorized add instruction. The ACC low 1210 may be configured to store 16, 16 bit elements. Each element in the ACC low 1210 is 16 bits in contrast to each element in the ACC 1202 that is only 8 bits in size. The vectorized add instruction may be executed to add 16, 8 bit, elements of the portion 1202*a* to 16 corresponding 16 bit elements in ACC low 1210, and store the resulting 16 sums in the 16 corresponding elements of the ACC low register 1210. For example, as illustrated in FIG. 8, byte 0 or element 0 in ACC register 1202 may be added to byte 0 or element 0 of ACC low 1210. The resulting sum of the foregoing element addition for byte 0 may be stored in byte 0 of ACC low 1210. Generally, element j in the portion 1202*a* may be added to element j of the register ACC low 1210. The results of the vectorized addition may be stored in the register ACC low 1210.

The portion 1202*b* may be added to a second additional accumulation register ACC high 1220 using a vectorized add instruction. The ACC high 1220 may be configured to store 16, 16 bit elements. Each element in the ACC high 1220 is 16 bits in contrast to each element in the ACC 1202 that is only 8 bits in size. The vectorized add instruction may be executed to add 16, 8 bit, elements of the portion 1202*b* to 16 corresponding 16 bit elements in ACC high 1220, and store the resulting 16 sums in the 16 corresponding elements of the ACC high register 1220. For example, as illustrated in FIG. 8, byte 16 or element 16 in ACC register 1202 may be added to byte 0 of ACC high 1220 denoted as element 16 of ACC high 1220. Generally byte or element K+16 of ACC 1220 corresponds to byte K of ACC high 1220 further denoted as element K+16 in ACC high 1220. The resulting sum of the foregoing element addition for may be stored in byte 0 of ACC high 1220 (e.g., denoted as element 16 of ACC high 1220). Generally, element j in the portion 1202*b* may be added to a corresponding element of the register ACC high 1220. The results of the vectorized addition may be stored in the register ACC high 1220.

Subsequent to adding 1202*a*, 1202*b* of the ACC 1202 respectively to the ACC low 1210 and the ACC high 1220, the ACC 1202 may be cleared. Each time the number of HVs added to the ACC 1202 reaches 255, prior to adding the 256$^{th}$ HV, the foregoing processing may be performed prior to adding the next HV to the ACC 1202 to avoid any possible overflow of the counters or elements in the ACC 1202.

Since each element in the additional registers 1210, 1220 is 16 bits rather than 8 bits, the possible overflow condition of the first level of counters of the ACC 1202 is avoided. Of course, it will be appreciated that the second level counters denoted by the elements of the additional registers 1210, 1220 also has a maximum value of $2^{16}-1$ that can be represented before it also experiences an overflow. In such an embodiment, N (the number of features in P) may not exceed $2^{16}-1$.

Figure 9:
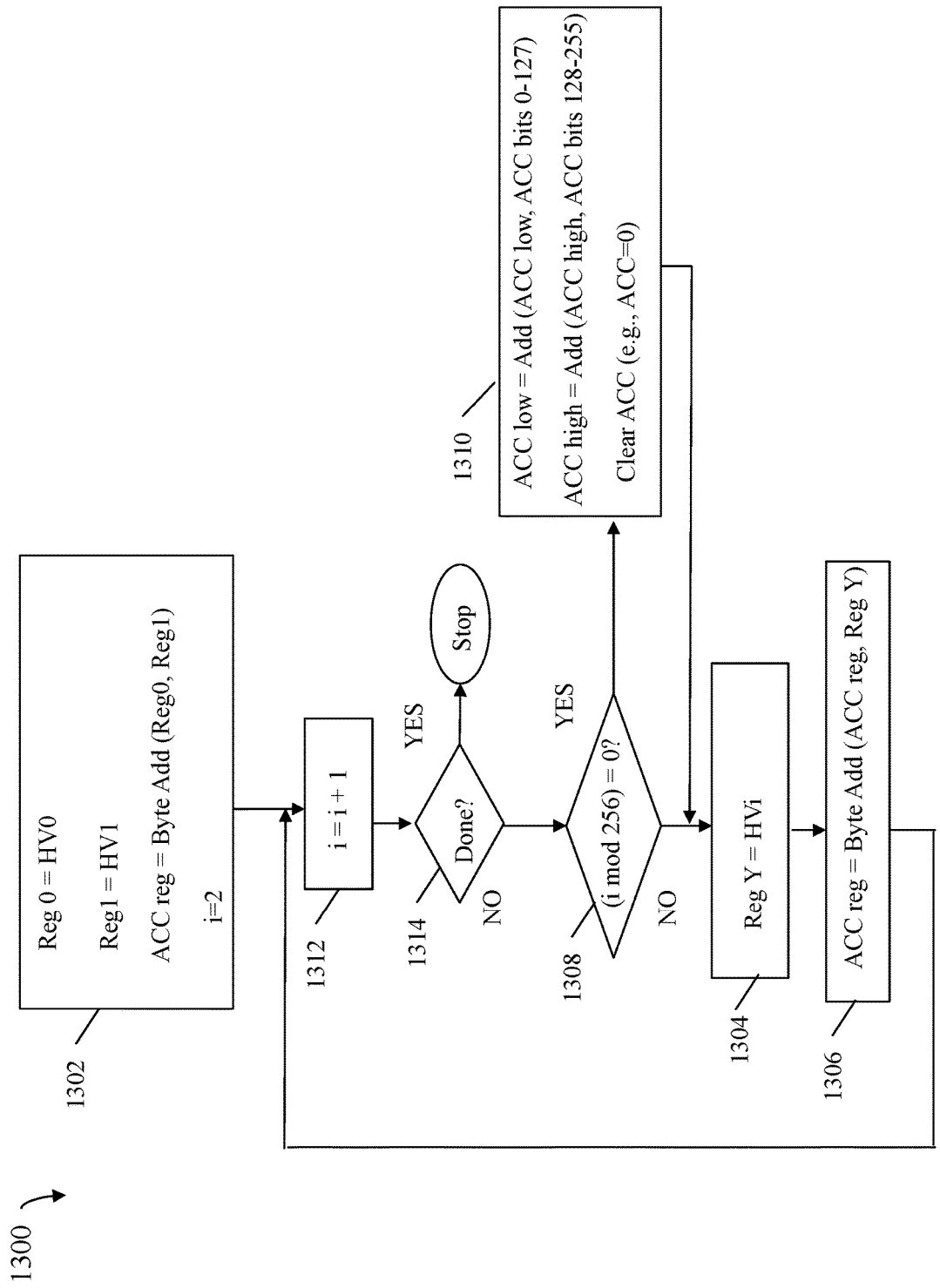

Referring to FIG. 9, shown is a flowchart 1300 of processing steps that may be performed in an embodiment in accordance with the techniques herein. The flowchart 1300 summarizes processing as described above (e.g., FIGS. 7 and 8) that may be performed to avoid possible overflow of the elements or counters of the ACC register 1202.

At the step 1302, HV0 may be loaded using vectorized instructions into register 0 and HV1 may be loaded into register 1. Additionally, a vectorized add may be performed to add register 0 and register 1 and store the results in the ACC register 1202. A control variable i may be assigned 2 to denote that 2 HVs have been added. From the step 1302, control proceeds to the step 1312.

At the step 1312, i is increased by 1. Control proceeds to the step 1314 where a determination is made as to whether processing of all bytes of P (and this all byte hashes of P) is complete. If step 1314 evaluates to yes, the processing of the flowchart 1300 stops. Processing may then resume by adding the next HV to the ACC register 1202. If the step 1314 evaluates to no, control proceeds to the step 1308.

At the step 1308, a determination is made as to whether (i mod 256)=0, where "mod" denotes the mathematical modulus function. As known in the art, (i mod 256) divides "i" by 256 and returns the remainder as the result. More generally, step 1308 is determining whether the next hash value to be processed would result in exceeding the maximum positive integer value that can be represented in each element or counter of the ACC register 1202. If the step 1308 evaluates to yes, control proceeds to the step 1310.

At the step 1310, ACC bits 0-127 (1202*a*) configured to store 16, 8 bit elements, are added (using a vectorized add instruction) to the ACC low register 1210 that is configured to store 16, 16 bit elements. At the step 1310, ACC bits 128-255 (1202*b*) configured to store 16, 8 bit elements, are added (using a vectorized add instruction) to the ACC high register 1220 that is configured to store 16, 16 bit elements. Additionally, the ACC register is cleared and reset to 0. From the step 1310 control proceeds to the step 1304. If the step 1308 evaluates to no, control proceeds to the step 1304.

At the step 1304, register Y (Reg y) may denote a 256 bit register configured to store 32, 8 bit elements. The next HVi may be loaded (using a vectorized load instruction) into Reg Y. From the step 1304, control proceeds to the step 1306. At the step 1306, processing is performed to add (using a vectorized add instruction) the ACC low and ACC high registers. From the step 1306, control proceeds to the step 1312.

Once all the N bytes of P have been processed, the two additional accumulation registers ACC low 1210 and ACC high 1220 collectively include 32 elements or counters each denoting a total count of the number of 1 bit values in a different one of the bit positions of the HVs and S(P). The total count is with respect to all N=512 HVs for bytes of P.

Figure 10:
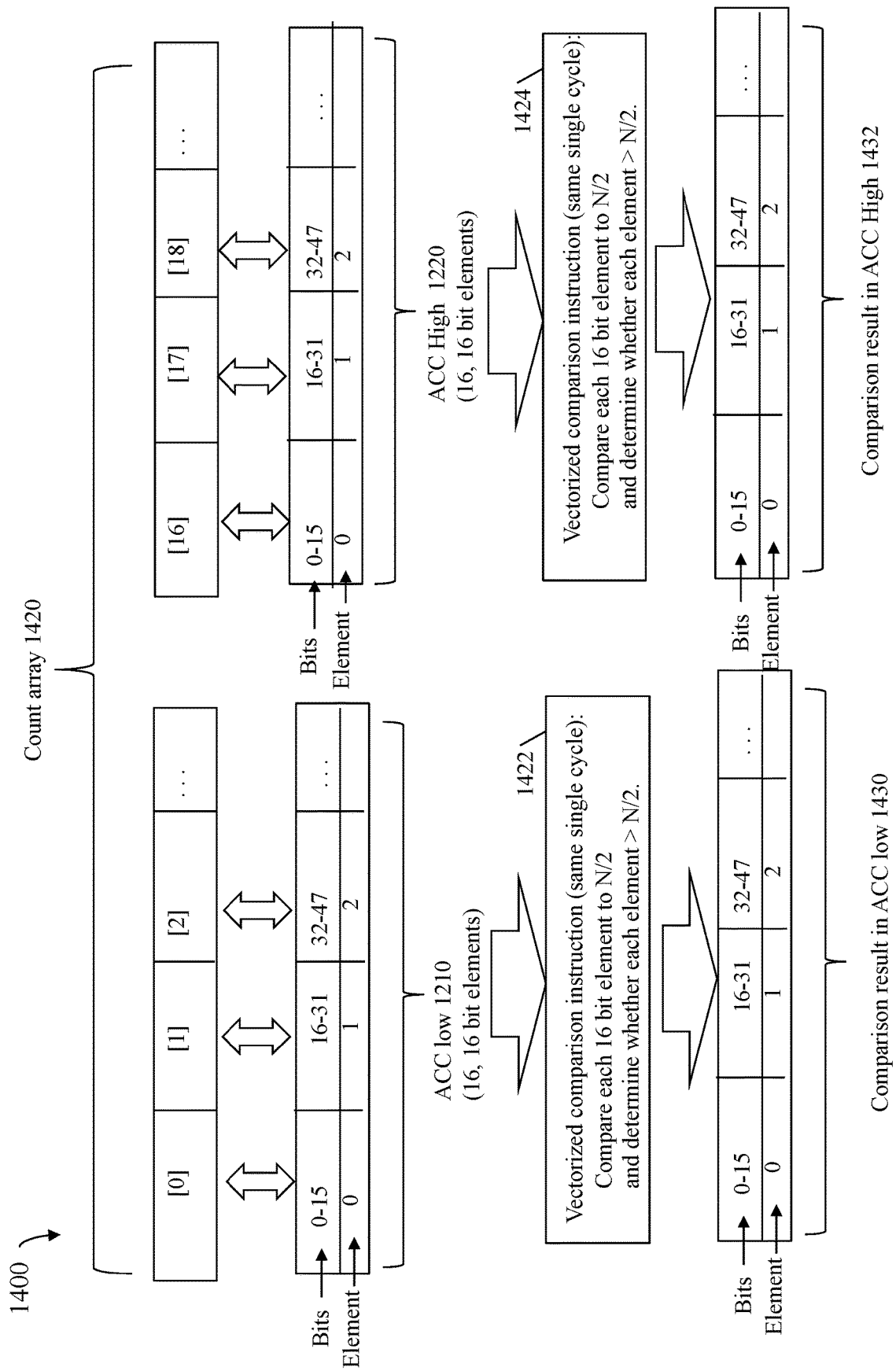
FIG. 10 is an example illustrating comparison processing in an embodiment in accordance with the techniques herein.

As a next step, a comparison is made to determine whether each of the elements or counters is greater than N/2 as described below with reference to FIG. 10.

Element 1420 illustrates a counter array of 32 elements or counters collectively included in the two additional accumulation registers ACC low 1210 and ACC high 1220. As noted above each of the 32 elements or counters denote a total count of the number of 1 bit values in a different one of the bit positions of the HVs and S(P). The total count is with respect to all N=512 HVs for bytes of P.

As denoted by 1422, a vectorized comparison instruction may be executed to compare each 16 bit element of ACC low 1210 to N/2 and determine whether each element is >N/2. Each 16 bit counter or element of ACC low 1210 is compared to a corresponding element in another register containing a value of N/2.

As denoted by 1430, the vectorized comparison instruction with respect to ACC low 1210 may store a resulting value in each of the 32 counters regarding the logical result of the comparison. In at least one embodiment, if a counter or element in the ACC low 1210 has a value that is >N/2, the counter of ACC low may have each of its bits set to 1 (e.g., 0xFFFF), and otherwise, the counter may have all its bits set to 0 (e.g., 0x0). Assuming the comparison results are also stored in ACC low, element 1430 represents the ACC low register after execution of the vectorized comparison instruction of 1422.

As denoted by 1424, a vectorized comparison instruction may be executed to compare each 16 bit element of ACC high 1220 to N/2 and determine whether each element is >N/2. Each 16 bit counter or element of ACC high 1220 is compared to a corresponding element in another register containing a value of N/2.

As denoted by 1432, the vectorized comparison instruction with respect to ACC high 1220 may store a resulting value in each of the 32 counters regarding the logical result of the comparison. In at least one embodiment, if a counter or element in the ACC high 1220 has a value that is >N/2, the counter of ACC high may have each of its bits set to 1 (e.g., 0xFFFF), and otherwise, the counter may have all its bits set to 0 (e.g., 0x0). Assuming the comparison results are also stored in ACC low, element 1432 represents the ACC high register after execution of the vectorized comparison instruction of 1424.

In at least one embodiment, the most significant bit (MSB) of each of the 32, 16 bit, elements or counters in ACC low 1320 and ACC high 1432 may be extracted, such as using other vectorized instructions. The extracted MSBs may be used to denote the values of the bitwise majority for the 32 bit positions of S(P). In other words, the extracted MSBs form the 32 bit values of S(P) that may be stored in a 32 bit location or register.

As a variation in at least one embodiment, rather than use 256 bit registers and associated vectorized instructions, 512 bit registers and associated vectorized instructions may be used. For example, AVX-512 registers and vectorized instructions may be used rather than AVX2 256 bit registers and vectorized instructions. Additional details are described below regarding an embodiment using 512 bit registers and associated vectorized instructions.

In such an embodiment, the table of precomputed hash values may store each precomputed hash value as a single 32 bit value rather than as an array or row of 32 bytes. This reduces the size of the table or tables used to store the precomputed hash values in comparison to the size as described above (e.g., in connection with FIG. 6).

Referring to FIG. 11, shown is an example of a table of precomputed hash values that may be used in an embodiment in accordance with the techniques herein. The table 1500 may be used as noted above in an embodiment using 512 bit registers and vectorized instructions.

The table of 1500 is a two dimensional table in which the byte value is used as the column identifier (Col ID) 1502 and the byte index is used as the row ID 1504. Thus each row includes the HVs for a single different byte index. Each cell or entry of the table 1500 may be 32 bits storing one precomputed hash value. As represented by 1501, "Table [index j of byte, byte value]" identifies an entry of the table including a precomputed 32 bit hash value for byte j having a bit representation with an integer value denoted by "byte value".

In such an embodiment using the table of FIG. 11, a vectorized instruction may be used to load each bit of the precomputed hash value from an entry of the table into a different 16 bit counter or element of a first 512 bit register. The first 512 bit register may be configured to store 32 elements, where each element is 16 bits. From here processing may be performed in a manner similar to that as described above using an ACC register also configured to store 32, 16 bit, elements where the ACC register and each newly loaded hash value of the first 512 bit register may be added using a vectorized add instruction. In such an embodiment, each counter or element of the ACC register is now 16 bits so the maximum possible value is $2^{16}-1$ rather than 255. As a result, processing performed to avoid possible counter overflow in the ACC register as described above in connection with FIGS. 8 and 9 may not be needed as long as the total number of bytes, or more generally features, of P does not exceed $2^{16}-1$.

It is straightforward given the description above to use vectorized instructions to compare each of the 32, 16 bit, counters or elements of ACC to N/2 and obtain the values of the bitwise majority for the 32 bit positions of S(P).

Figure 12:
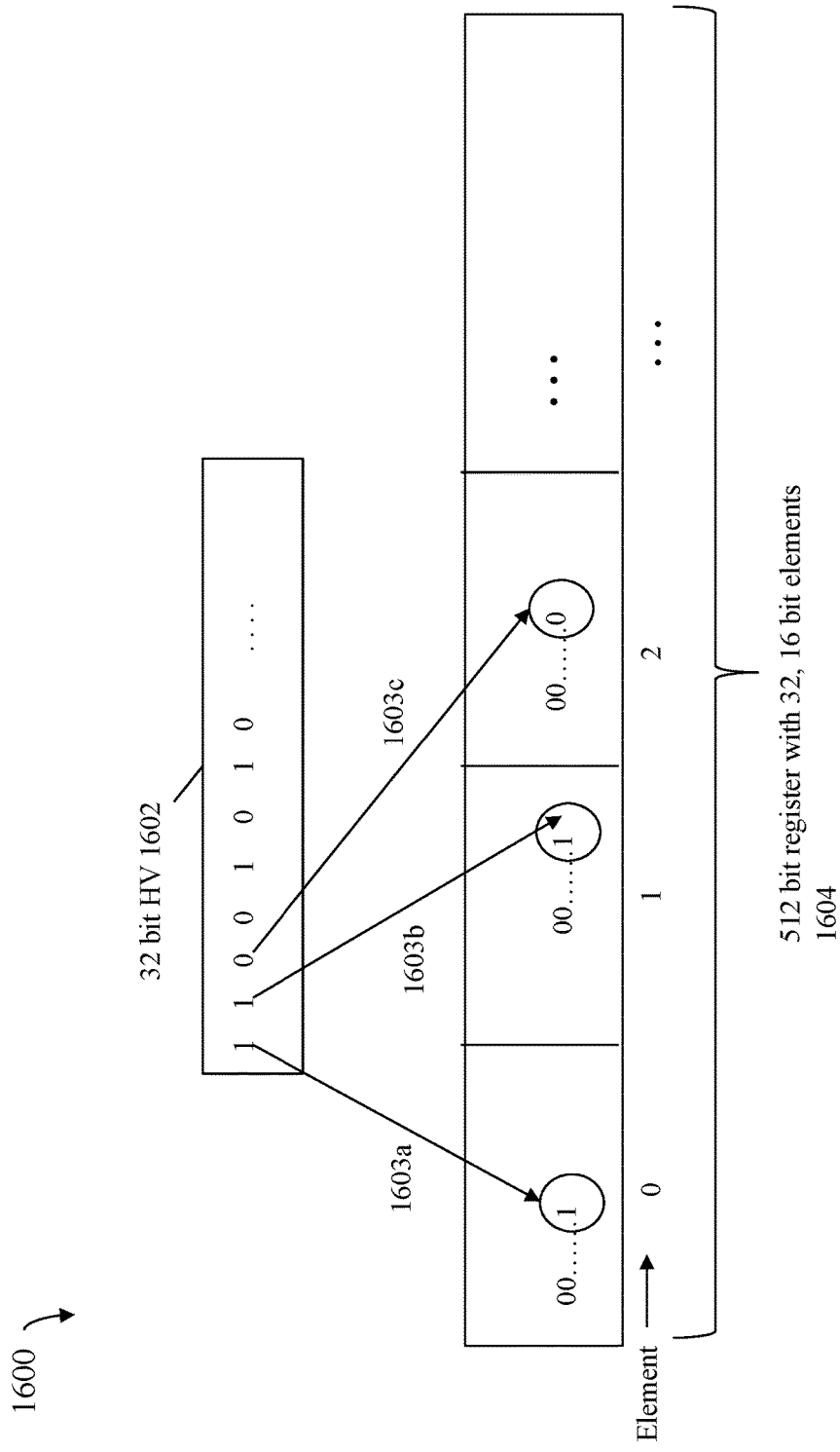
FIG. 12 is an example illustrating extraction of bit of a hash value for use in connection with the techniques herein.

Referring to FIG. 12, shown is an example illustrating use of a vectorized instruction to load each bit of the precomputed hash value from an entry of the table into a different 16 bit counter or element of a first 512 bit register in an embodiment in accordance with the techniques herein.

The example 1600 includes HV 1602 as may be stored in a cell or entry of the table 1500. A vectorized load and mask instruction may be used that loads each of the 32 bits of 1602 into a single bit of a corresponding element in the 512 bit register 1604 and may zero fill remaining bits of 1604. The register 1604 may be configured to store 32, 16 bit, elements. As illustrated by 1603a, bit 0 of the HV 1602 may be extracted and stored in a single bit of element or counter 0 of 1604; bit 1 of the HV 1602 may be extracted and stored in a single bit of element or counter 1 of 1604; bit 2 of the HV 1602 may be extracted and stored in a single bit of element or counter 2 of 1604; and so on for all 32 bits of the HV 1602.

Figure 13:
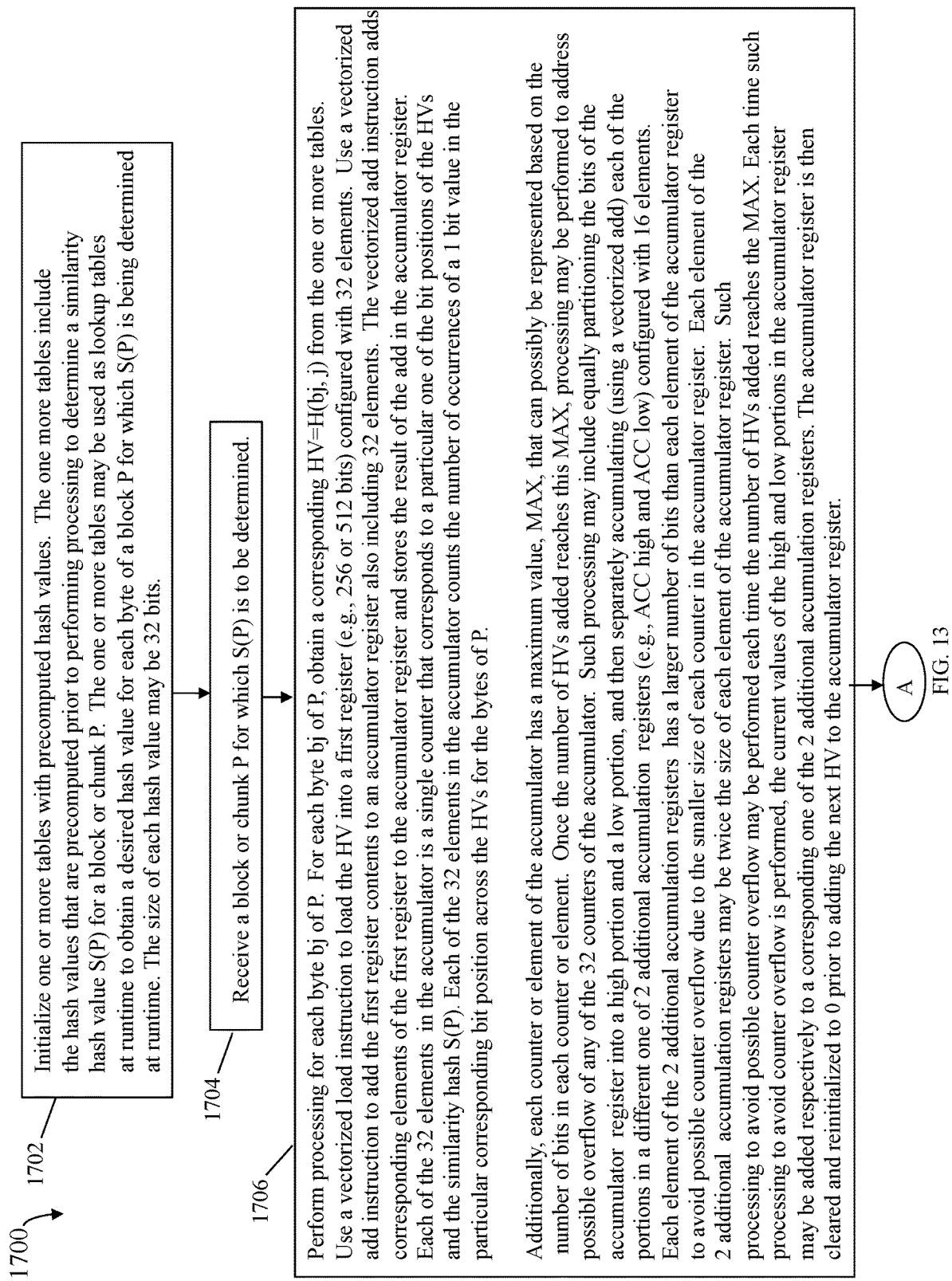
Figure 14:
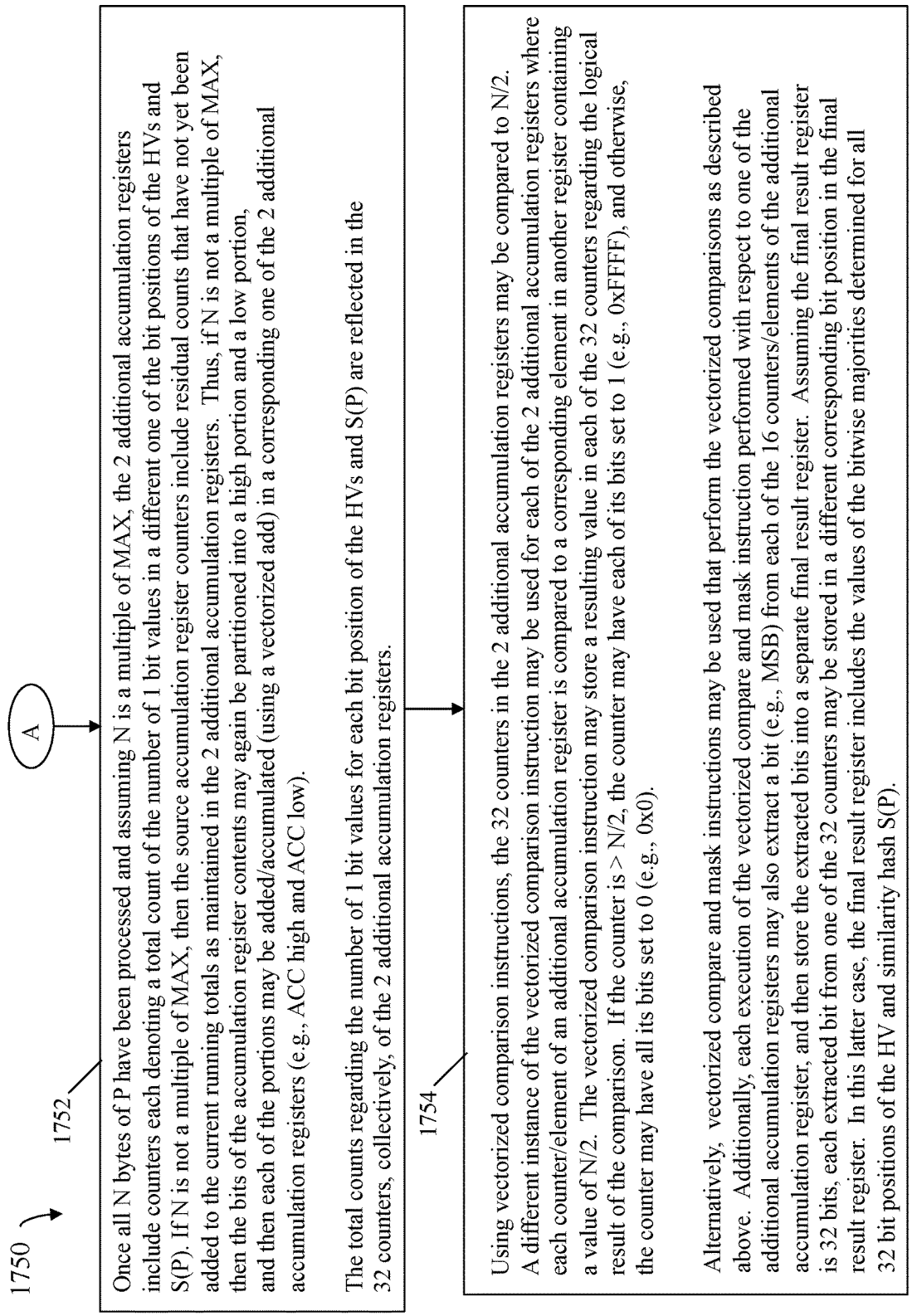

Referring to FIGS. 13 and 14, shown is a flowchart of processing steps that may be performed in an embodiment in accordance with the techniques herein. The flowchart summarizes processing described above in connection with an embodiment in which the overflow avoidance processing (e.g., FIGS. 8 and 9) is also performed such as when each counter or element is 8 bits, and registers used with vectorized instructions are 256 bits.

At the step 1702, one or more tables may be initialized with precomputed hash values. The one more tables include the hash values that are precomputed prior to performing processing to determine a similarity hash value S(P) for a block or chunk P. The one or more tables may be used as lookup tables at runtime to obtain a desired hash value for each byte of a block P for which S(P) is being determined at runtime. The size of each hash value may be 32 bits. As described herein, the table of hash values may be implemented as a single 3 dimensional table or multiple 2 dimensional tables. From the step 1702 control proceeds to the step 1704.

At the step 1704, a data block or chunk is received for which S(P) is to be determined. From the step 1704, control proceeds to the step 1706.

At the step 1706, processing may be performed for each byte bj of P. For each byte bj of P, obtain a corresponding HV=H(bj, j) from the one or more tables initialized in the step 1702. A vectorized load instruction may be used to load the HV into a first register (e.g., 256 or 512 bits) configured with 32 elements. A vectorized add instruction may be used to add the first register contents to an accumulator register also including 32 elements. The vectorized add instruction adds corresponding elements of the first register to the accumulator register and stores the result of the add in the accumulator register. Each of the 32 elements in the accumulator is a single counter that corresponds to a particular one of the bit positions of the HVs and the similarity hash S(P). Each of the 32 elements in the accumulator counts the number of occurrences of a 1 bit value in the particular corresponding bit position across the HVs for the bytes of P.

Additionally, in connection with the step 1706, each counter or element of the accumulator has a maximum value, MAX, that can possibly be represented based on the number of bits in each counter or element. For example, for byte or 8 bit elements or counters, MAX is 255. Once the number of HVs added reaches this MAX, processing may be performed to address possible overflow of any of the 32 counters of the accumulator. Such processing avoid possible counter overflow may be performed prior to adding the $256^{th}$ HV to the accumulator register. Such processing may include equally partitioning the bits of the accumulator register into a high portion and a low portion, and then separately accumulating (using a vectorized add) each of the portions in a different one of 2 additional accumulation registers (e.g., ACC high and ACC low) configured with 16 elements. Each element of the 2 additional accumulation registers has a larger number of bits than each element of the accumulator register to avoid possible counter overflow due to the smaller size of each counter in the accumulator register. Each element of the 2 additional accumulation registers may be twice the size of each element of the accumulator register. Such processing to avoid possible counter overflow may be performed each time the number of HVs added reaches the MAX. Each time such processing to avoid counter overflow is performed, the current values of the high and low portions in the accumulator register may be added respectively to a corresponding one of the 2 additional accumulation registers. The accumulator register is then cleared and reinitialized to 0 prior to adding the next HV to the accumulator register. From the step 1706, control proceeds to the step 1752.

At the step 1752, once all N bytes of P have been processed and assuming N is a multiple of MAX, the 2 additional accumulation registers include counters each denoting a total count of the number of 1 bit values in a different one of the bit positions of the HVs and S(P). If N is not a multiple of MAX, then the source accumulation register counters include residual counts that have not yet been added to the current running totals as maintained in the 2 additional accumulation registers. Thus, if N is not a multiple of MAX, then the bits of the accumulation register contents may again be partitioned into a high portion and a low portion, and then each of the portions may be added/ accumulated (using a vectorized add) in a corresponding one of the 2 additional accumulation registers (e.g., ACC high and ACC low). The total counts regarding the number of 1 bit values for each bit position of the HVs and S(P) are reflected in the 32 counters, collectively, of the 2 additional accumulation registers. From the step 1752, control proceeds to the step 1754.

At the step 1754, using vectorized comparison instructions, each of the 32 counters in the 2 additional accumulation registers may be compared to N/2. A different instance of the vectorized comparison instruction may be used for each of the 2 additional accumulation registers where each counter or element of an additional accumulation register is compared to a corresponding element in another register containing a value of N/2. The vectorized comparison instruction may store a resulting value in each of the 32 counters regarding the logical result of the comparison. If the counter is >N/2, the counter may have each of its bits set to 1 (e.g., 0xFFFF), and otherwise, the counter may have all its bits set to 0 (e.g., 0x0).

Alternatively, vectorized compare and mask instructions may be used that perform the vectorized comparisons as described above. Additionally, each execution of the vectorized compare and mask instruction performed with respect to one of the additional accumulation registers may also extract a bit (e.g., MSB) from each of the 16 counters/elements of the additional accumulation register, and then store the extracted bits into a separate final result register. Assuming the final result register is 32 bits, each extracted bit from one of the 32 counters may be stored in a different corresponding bit position in the final result register. In this latter case, the final result register includes the values of the bitwise majorities determined for all 32 bit positions of the HV and similarity hash S(P).

What will now be described are additional flowcharts summarizing processing that may be performed in an embodiment in accordance with the techniques herein. The FIGS. 15, 16, 17 and 18 summarize processing described above illustrating exemplary uses of the similarity hash values S computed for different blocks or chunks.

Figure 15:
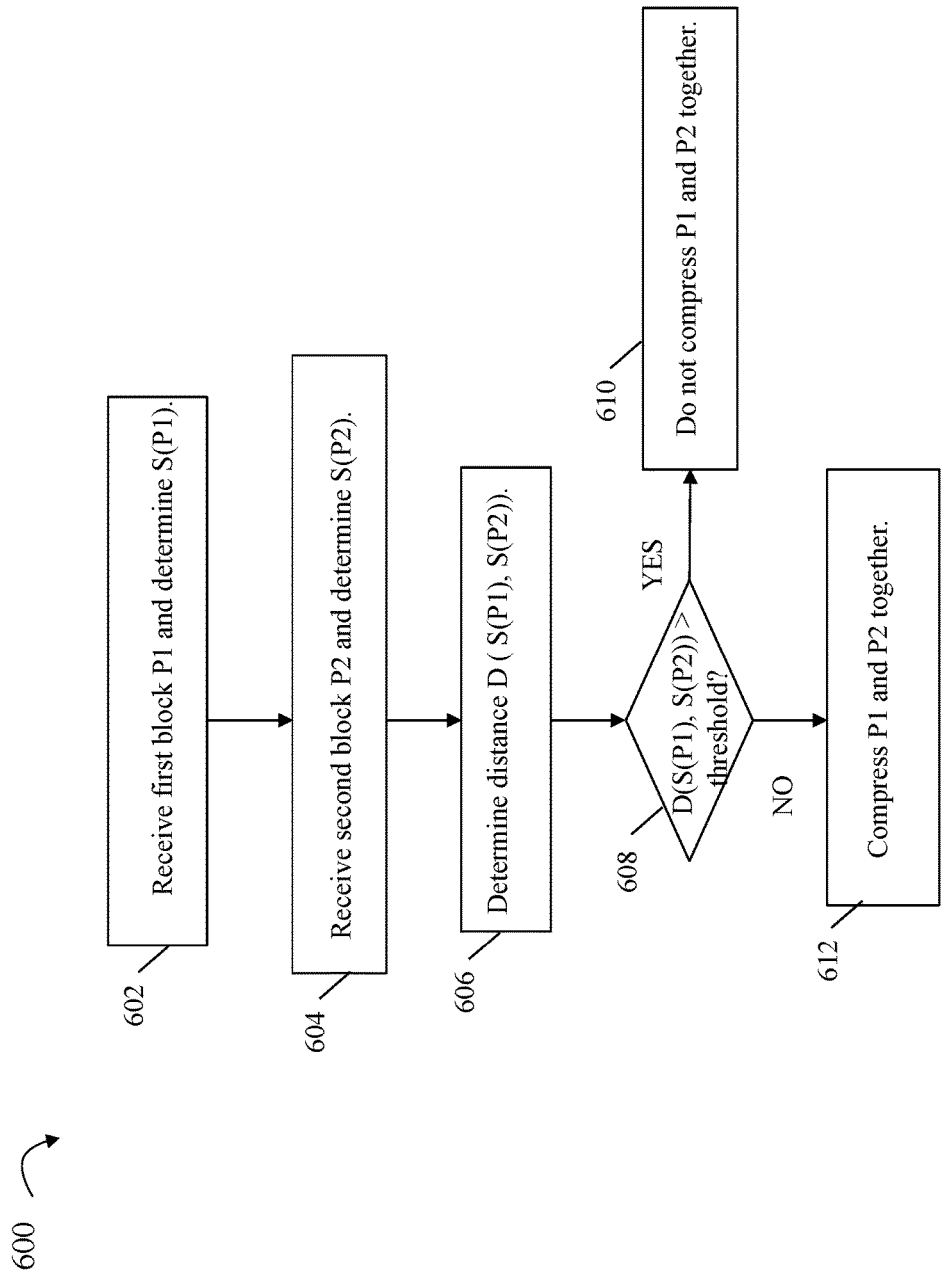

Referring to FIG. 15, shown is a flowchart 600 of processing that may be performed in an embodiment in accordance with the techniques herein. The flowchart 600 may be performed to determine whether to compress 2 blocks or chunks—P1 and P2—together.

At the step 602, P1 may be received and S(P1), the similarity hash for P1, may be determined. From the step 602, control proceeds to the step 604.

At the step 604, P2 may be received and S(P2), the similarity hash for P4, may be determined. From the step 604, control proceeds to the step 606.

At the step 606, the distance D(S(P1), S(P2)) may be determined, where the distance may be the Hamming distance as described herein. From the step 606, control proceeds to the step 608 where a determination is made as to whether D(S(P1), S(P2)) exceeds a specified threshold T1. If the step 608 evaluates to yes, control proceeds to the step 610 where processing determines not to compress P1 and P2 together since P1 and P2 are determined not to be similar based on the similarity threshold T1. If the step 608 evaluates to no, control proceeds to the step 612 where P1 and P1 are compressed together and included in the same single compressible unit. If the step 608 evaluates to no, it means that P1 and P2 are determined to be similar based on the similarity threshold T1.

The flowchart 600 is illustrated with respect to only 2 blocks or chunks. However, more generally, the use of similarity hashes computed with the similarity hash function S processing as described herein may be performed with respect to any suitable number of chunks or blocks, such as more than 2.

Figure 16:
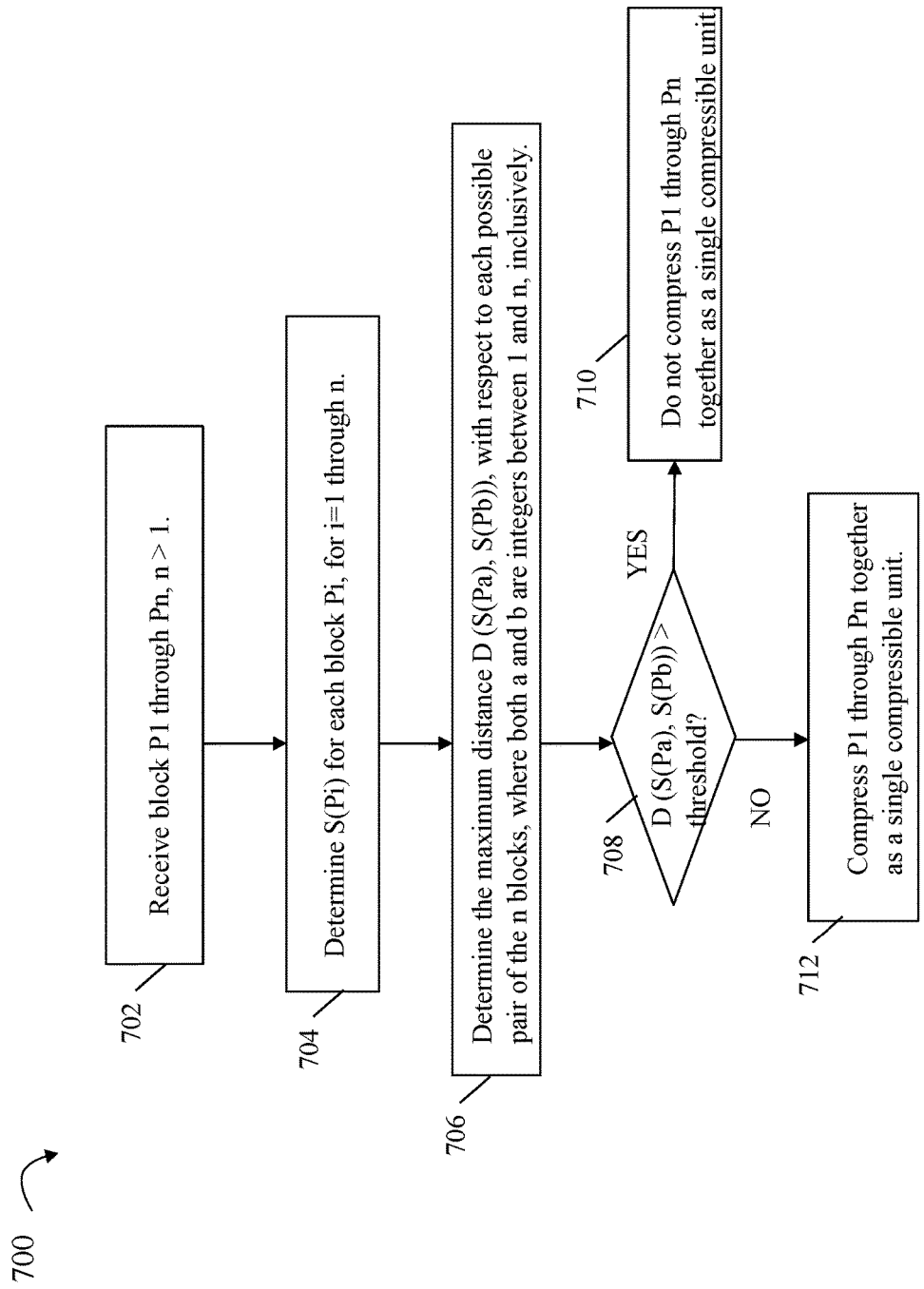

Referring to FIG. 16, shown is another flowchart 700 of processing that may be performed in an embodiment in accordance with the techniques herein. The flowchart 700 may be performed to determine whether to compress a group of n blocks or chunks together as a single compressible unit, where n may be larger than 1. Thus, the flowchart 700 generalizes the processing of FIG. 15 for any number of multiple chunks or blocks n, where n is more than 1.

At the step 702, blocks or chunks P1 through Pn are received, where n>1. From the step 702, control proceeds to the step 704. At the step 704, processing is performed to determine S(Pi) the similarity hash, for each Pi, for i=1 through n. From the step 704, control proceeds to the step 706. At the step 706, processing determines the maximum distance D (S(Pa), S(Pb)), with respect to each pair of the n blocks or chunks, where both a and b are integers between 1 and n, inclusively. The distance D may be the Hamming distance as described elsewhere herein. From the step 706, control proceeds to the step 708.

At the step 708, a determination is made as to whether D (S(Pa), S(Pb)) is greater than a specified threshold T denoting a similarity threshold. If the step 708 evaluates to yes, then control proceeds to the step 710 where it is determined that all the chunks or block P1 through Pn are not similar to one another and all such n blocks or chunks may not be compressed as a single compressible unit. If the step 708 evaluates to no, then control proceeds to the step 712 where it is determined all the blocks P1 through Pn are sufficiently similar to one another and may be compressed as a single compressible unit.

Generally, if the step 708 evaluates to yes as noted above, it may be that a portion or subset of less than all the n blocks or chunks are sufficiently similar to one another to be compressed as a single compressible unit, where the maximum distance D (S(Pa), S(Pb)) with respect to each pair of blocks or chunks Pa and Pb in the subset or portion does not exceed the specified threshold. In such a case where the maximum distance D (S(Pa), S(Pb)) with respect to each pair of chunks or blocks Pa and Pb in the subset or portion does not exceed the specified threshold, the blocks in the subset or portion may be compressed together as a single compressible unit.

Figure 17:
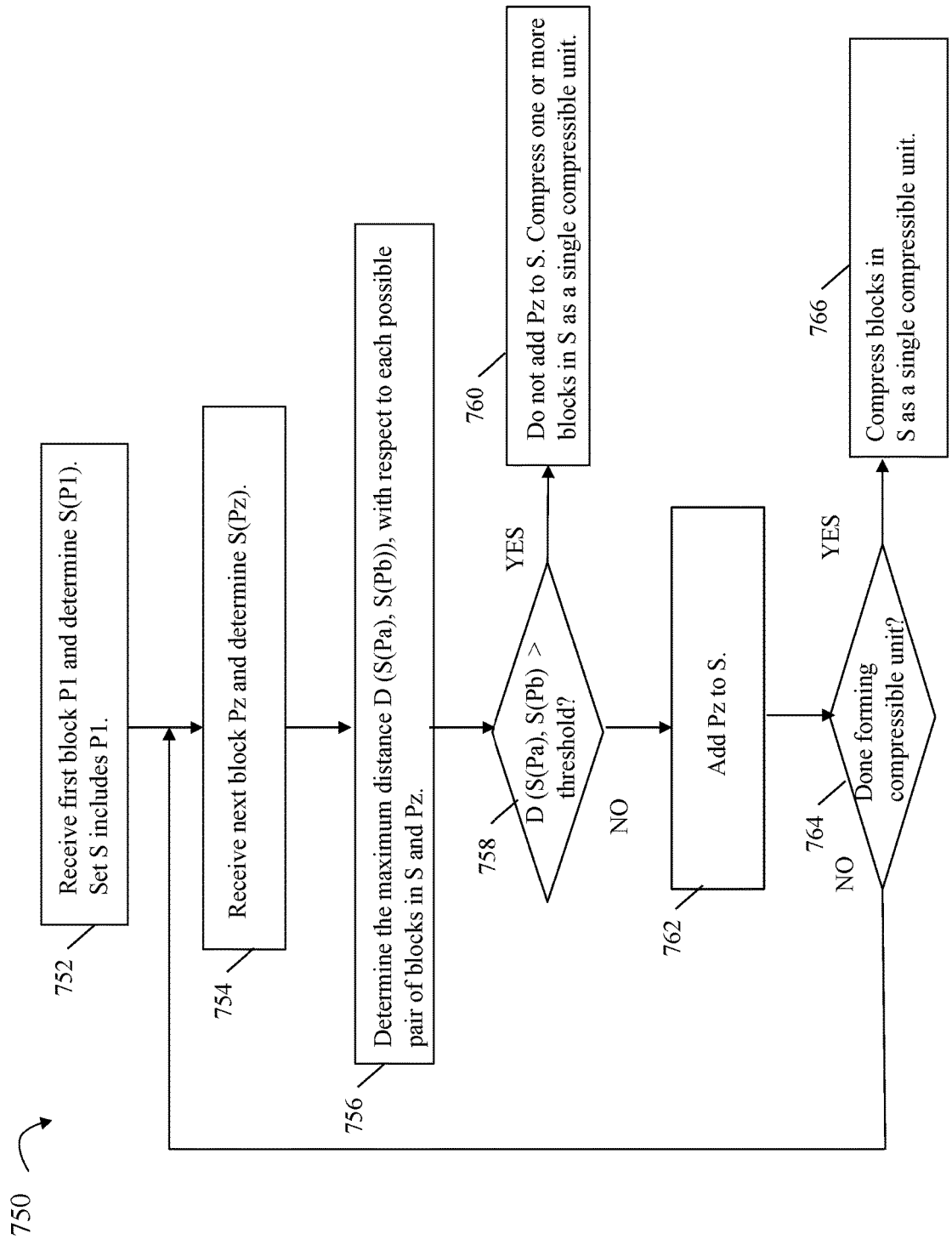

Referring to FIG. 17, shown is yet another flowchart 750 of processing that may be performed in an embodiment in accordance with the techniques herein. The flowchart 750 may be performed to traverse a list of blocks received and determine a subset S of the blocks to be compressed as a single compressible unit, where n may be 1 or more. FIG. 17 processing may be characterized as processing a new block Pz that is added to a current set S if the new block Pz is determined to be similar to other one or more blocks currently included in the set S. Thus, the set S may be incrementally determined and increased one new block at a time.

At the step 752, a first block P1 is received and the similarity hash S(P1) is determined. From the step 752, control proceeds to the step 754 where a next block Pi is received and the similarity hash S(Pz) is determined. From the step 754, control proceeds to the step 756.

At the step 756, processing determines the maximum distance D (S(Pa), S(Pb)), with respect to each possible pair of blocks determined with respect to S and Pz. From the step 756, control proceeds to the step 758. At the step 758, a determination is made as to whether the maximum distance D (S(Pa), S(Pb)) exceeds a specified threshold. If the step 758 evaluates to yes, control proceeds to the step 760. At the step 760, processing determines not to add Pz to the set S and to compress the one or more blocks currently in S (without Pz) as a single compressible unit. If the step 758 evaluates to no, control proceeds to the step 762 where Pz is added to the set S. From the step 762, control proceeds to the step 764.

At the step 764, a determination is made as to whether processing is done or complete for forming a compressible unit for those blocks in the set S. The step 764 may terminate processing with respect to forming a compressible unit based on the blocks currently in S based on any suitable condition or criteria. For example, an embodiment may specify a maximum number of blocks that may be compressed as a single compressible unit. If the number of blocks currently in S reaches this maximum, then step 764 may evaluates to yes. If the step 764 evaluates to yes, control proceeds to the step 766 to compress the blocks currently in S as a single compressible unit. If the step 764 evaluates to no, control proceeds to the step 754 to continue with the next block.

Figure 18:
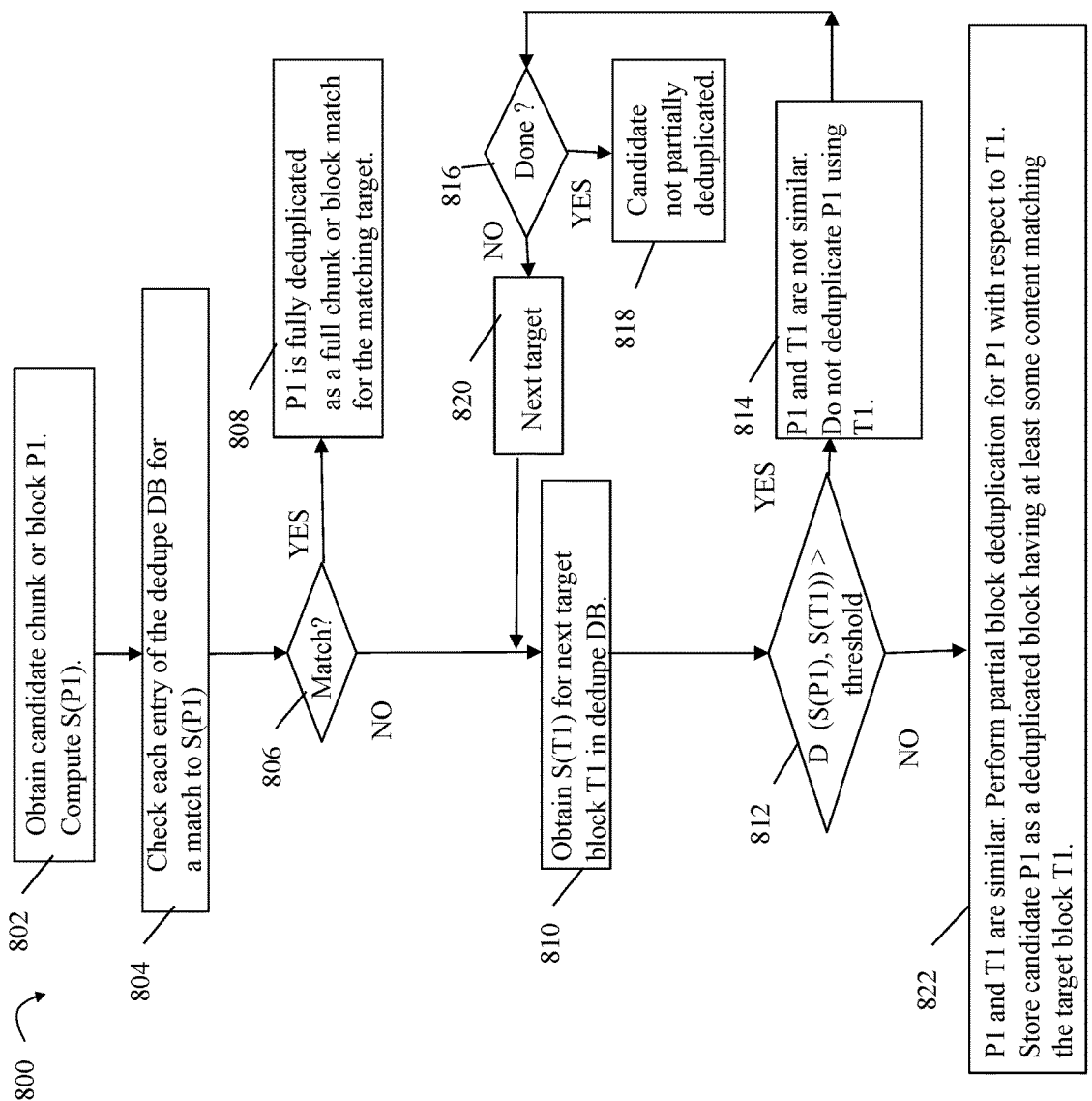

Referring to FIG. 18, shown is another flowchart 800 of processing that may be performed in an embodiment in accordance with the techniques herein. The flowchart 800 may be performed in connection with data deduplication. At the step 802, a candidate block or chunk P1 may be obtained and the similarity hash S(P1) may be determined for P1. From the step 802, control proceeds to the step 804. At the step 804, each entry of the dedupe DB may be checked to determine a match to S(P1). The dedupe DB may include, for each target chunk or block T, its similarity hash S(T) which may be compared in the step 804 to S(P1). From the step 804, control proceeds to the step 806 to determine whether a matching entry in the dedupe DB was located where the matching entry is for a target block T having S(T)=S(P1). If the step 806 evaluates to yes, control proceeds to the step 808 where P1 is fully deduplicated as a full block match for the matching target block T.

If the step 806 evaluates to no, control proceeds to the step 810 where processing commences to determine whether the candidate block P1 may be partially deduplicated with respect to a target block in the dedupe DB. At the step 810, the similarity hash S(T1) for a next target block T1 in the dedupe DB is obtained. At this point T1 may correspond to a first entry in the dedupe DB. From the step 810, control proceeds to the step 812. At the step 812, processing is performed that determined whether the distance D(SP(1), SP(T1) exceeds a specified threshold.

If the step 812 evaluates to yes, control proceeds to the step 814 where it is determined that P1 and T1 are not similar and P1 is not partially deduplicated with respect to T1. From the step 814, control proceeds to the step 816 where a determination is made as to whether processing for the candidate block P1 is complete. If the step 816 evaluates to yes, control proceeds to the step 818 where the candidate P1 is not partially deduplicated. If the step 816 evaluates to no, control proceeds to the step 820 where the next entry T1 from the dedupe DB is processed. From the step 820, control proceeds to the step 810.

If the step 812 evaluates to no, control proceeds to the step 822 where it is determined that P1 and T1 are similar. The step 822 may include performing partial or sub-block duplication for P1 with respect to T1. The candidate P1 may be stored as a partially deduplicated block having at least some content that matches the current target T1. Consistent with discussion herein, for example, the information stored for the partially deduplicated block P1 may reference the current target T1 and may additionally store any unique content of P1 that is different from T1. When needed such as when servicing a read miss operation, P1 may be formed by obtaining the content of T1 and storing it in a cache, buffer or other memory location, and then overwriting cache, buffer or other memory location with the unique content of P1.

It should be generally noted that the terms digest, hash value, hash key, hash, and hash digest may be used interchangeably in various contexts herein to refer to an output generated by a hash function. In some contexts and in some embodiments, a hash value, hash or hash key may be directly output by a hash function, such as H, for a particular input, and a truncated form of the hash function output may be used in connection with the techniques herein rather than a full hash value.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing data comprising:
receiving a data block P having a binary representation;
determining a plurality of features for the data block P;
determining, using at least one table of precomputed hash values, a plurality of feature hashes for the plurality of features, wherein each of the plurality of feature hashes corresponds to a different one of the plurality of features, wherein each of the plurality of feature hashes is one of the precomputed hash values of the at least one table; and
determining, in accordance with the plurality of feature hashes for the plurality of features, a similarity hash for the data block P, wherein each of the plurality of feature hashes is determined using a hash function and in accordance with one of the plurality of features and a unique index associated with said one of the plurality of features, wherein the data block P is partitioned into N features, each of the N features has a corresponding index included in a feature index range, each of the N features has a corresponding bit representation denoting an integer included in a feature value range, and wherein the at least one table includes each possible hash value computable by the hash function in accordance with the feature value range and the feature index range.

2. The method of claim 1, wherein each of the N features is a different byte of the data block P, wherein the feature index range is from 0 through N−1 inclusively, and wherein the feature value range is a byte value range from 0 through 255 inclusively.

3. The method of claim 1, wherein the at least one table is a single table having three dimensions, wherein a first of the three dimensions corresponds to unique indices associated with features, a second of the three dimensions corresponds to integer values of bit representations of features, and a third dimension of the three dimensions corresponds to bit positions of precomputed hash values stored in the single table.

4. The method of claim 3, wherein each entry of the single table is a byte that stores a single bit value of one precomputed hash value stored in the single table, and wherein each row of the single table is a representation of a single precomputed hash value stored in the single table.

5. The method of claim 2, wherein the at least one table includes N tables and wherein each one of the N tables includes precomputed hash values for a different unique index associated with one of the N features.

6. The method of claim 5, wherein each of the N tables has a first dimension corresponding to integer values of bit representations of features, and a second dimension corresponding to bit positions of precomputed hash values.

7. The method of claim 6, wherein each entry of each of the N tables is a byte that stores a single bit value of one precomputed hash value stored in the single table, and wherein each row of each of the N tables is a representation of a single precomputed hash value stored in the single table.

8. The method of claim 7, wherein each of the plurality of feature hashes has a size of K bits, and wherein the similarity hash for the data block P has a size of K bits.

9. The method of claim 8, wherein a first row of a first of the N tables represents a first hash value for a first of the plurality of features of the data block P and wherein the method further comprises:
loading the first row of the first table into a first register using a vectorized load instruction, wherein the first register is configured to have K elements, and wherein the vectorized load instructions loads entries of the first row into corresponding elements of the first register; and
adding the first register to an accumulation register using a vectorized add instruction, wherein the accumulation register is configured to have K elements and the vectorized add instruction adds elements of the first register to corresponding elements of the accumulation register and stores results in the corresponding elements of the accumulation register.

10. The method of claim 9, wherein the K elements denote K counters, wherein MAX is a maximum value that can be represented by each of the K counters in accordance with a number of bits of each of the K counters.

11. The method of claim 10, wherein responsive to determining that MAX hash values have been added corresponding to MAX features of the data block P, first processing is performed to avoid possible overflow of the K counters, said first processing comprising:
partitioning the K elements of the accumulation register into a first portion of K/2 elements and a second portion of K/2 elements;
using a vectorized add instruction to add the first portion of K/2 elements of the accumulation register to a first additional accumulation register configured to have K/2 elements, wherein each of the K/2 elements of the first additional accumulation register includes a larger number of bits than each of the K elements of the accumulation register; and
using a vectorized add instruction to add the second portion of K/2 elements of the accumulation register to a second additional accumulation register configured to have K/2 elements, wherein each of the K/2 elements of the second additional accumulation register includes a larger number of bits than each of the K elements of the accumulation register.

12. The method of claim 11, wherein the first additional accumulation register and the second additional accumulation register are collectively configured to have K elements representing the K counters, wherein each of the K counters has a value indicating a total count of 1 bit values for a corresponding bit position of the similarity hash for the data block P.

13. The method of claim 12, further comprising:
using a first vectorized comparison instruction to compare each of the K/2 elements of the first additional accumulation register to a first value, N/2, and determine whether each of the K/2 elements has a counter value greater than the first value, wherein the first vectorized comparison instruction stores a resulting value in each of the K/2 elements indicating whether said each elements has a counter value greater than the first value.

14. The method of claim 1, further comprising:
performing data reduction processing using the similarity hash has for the data block P.

15. The method of claim 14, wherein the data reduction processing includes compression processing.

16. The method of claim 14, wherein the data reduction processing includes deduplication processing.

17. A system comprising:
at least one processor; and
at least one memory comprising code stored thereon that, when executed, performs a method of processing data comprising:
receiving a data block P having a binary representation;
determining a plurality of features for the data block P;
determining, using at least one table of precomputed hash values, a plurality of feature hashes for the plurality of features, wherein each of the plurality of feature hashes corresponds to a different one of the plurality of features, wherein each of the plurality of feature hashes is one of the precomputed hash values of the at least one table; and
determining, in accordance with the plurality of feature hashes for the plurality of features, a similarity hash for the data block P, wherein each of the plurality of feature hashes is determined using a hash function and in accordance with one of the plurality of features and a unique index associated with said one of the plurality of features, wherein the data block P is partitioned into N features, each of the N features has a corresponding index included in a feature index range, each of the N features has a corresponding bit representation denoting an integer included in a feature value range, and wherein the at least one table includes each possible hash value computable by the hash function in accordance with the feature value range and the feature index range.

18. A non-transitory computer readable medium comprising code stored thereon that, when executed, performs method of processing data comprising:
receiving a data block P having a binary representation;
determining a plurality of features for the data block P;
determining, using at least one table of precomputed hash values, a plurality of feature hashes for the plurality of features, wherein each of the plurality of feature hashes corresponds to a different one of the plurality of features, wherein each of the plurality of feature hashes is one of the precomputed hash values of the at least one table; and
determining, in accordance with the plurality of feature hashes for the plurality of features, a similarity hash for the data block P, wherein each of the plurality of feature hashes is determined using a hash function and in accordance with one of the plurality of features and a unique index associated with said one of the plurality of features, wherein the data block P is partitioned into N features, each of the N features has a corresponding index included in a feature index range, each of the N features has a corresponding bit representation denoting an integer included in a feature value range, and wherein the at least one table includes each possible hash value computable by the hash function in accordance with the feature value range and the feature index range.

* * * * *

UNITED STATES PATENT AND TRADEMARK OFFICE
CERTIFICATE OF CORRECTION

PATENT NO.         : 11,436,209 B2
APPLICATION NO.    : 16/669860
DATED              : September 6, 2022
INVENTOR(S)        : Uri Shabi et al.

It is certified that error appears in the above-identified patent and that said Letters Patent is hereby corrected as shown below:

In the Claims

In Claim 14, the phrase "similarity hash has for the" should read -- similarity hash for the --

Signed and Sealed this
Eleventh Day of October, 2022

*Katherine Kelly Vidal*

Katherine Kelly Vidal
*Director of the United States Patent and Trademark Office*